United States Patent
Chu et al.

(10) Patent No.: US 11,436,065 B2
(45) Date of Patent: Sep. 6, 2022

(54) SYSTEM FOR EFFICIENT LARGE-SCALE DATA DISTRIBUTION IN DISTRIBUTED AND PARALLEL PROCESSING ENVIRONMENT

(71) Applicant: Hong Kong Baptist University, Hong Kong (HK)

(72) Inventors: Xiaowen Chu, Hong Kong (CN); Shaohuai Shi, Hong Kong (CN); Kaiyong Zhao, Hong Kong (CN)

(73) Assignee: Hong Kong Baptist University, Hong Kong (HK)

( * ) Notice: Subject to any disclaimer, the term of this patent is extended or adjusted under 35 U.S.C. 154(b) by 500 days.

(21) Appl. No.: 16/731,095

(22) Filed: Dec. 31, 2019

(65) Prior Publication Data

US 2021/0200610 A1    Jul. 1, 2021

(51) Int. Cl.
*G06F 9/54* (2006.01)
*G06N 3/08* (2006.01)
*G06N 3/04* (2006.01)
*H04L 69/04* (2022.01)
*H04L 9/40* (2022.01)

(52) U.S. Cl.
CPC ............. *G06F 9/546* (2013.01); *G06N 3/04* (2013.01); *G06N 3/0454* (2013.01); *G06N 3/084* (2013.01); *H04L 9/40* (2022.05); *H04L 69/04* (2013.01)

(58) Field of Classification Search
CPC .......... G06N 3/08; G06N 3/04; G06N 3/0454; G06N 3/10; G06N 3/063; G06N 3/084; H04L 69/04; H04L 9/40; G06F 17/15; G06F 9/546; G06F 17/153
See application file for complete search history.

(56) References Cited

U.S. PATENT DOCUMENTS

| | | | |
|---|---|---|---|
| 11,188,828 B2 * | 11/2021 | Diaz Caceres | G06N 5/02 |
| 2016/0174902 A1 * | 6/2016 | Georgescu | G16H 50/30 600/408 |
| 2018/0121806 A1 * | 5/2018 | Haruki | G06N 3/084 |
| 2018/0181864 A1 * | 6/2018 | Mathew | G06N 3/08 |

(Continued)

FOREIGN PATENT DOCUMENTS

WO    WO-2020081399 A1 *    4/2020    ........... G06N 3/0454

OTHER PUBLICATIONS

HPDL: Towards a General Framework for High-performance Distributed Deep Learning—2019 (Year: 2019).*

(Continued)

*Primary Examiner* — Nizar N Sivji
(74) *Attorney, Agent, or Firm* — Idea Intellectual Limited; Margaret A. Burke; Sam T. Yip

(57) ABSTRACT

The present invention relates to a system for efficient large-scale data distribution in a distributed and parallel processing environment. In particular, the present invention relates to global Top-k sparsification for low bandwidth networks. The present invention verifies that gTop-k S-SGD has nearly consistent convergence performance with S-SGD and evaluates the training efficiency of gTop-k on a cluster with 32 GPU machines which are inter-connected with 1 Gbps Ethernet. The experimental results show that the present invention achieves up to 2.7-12× higher scaling efficiency than S-SGD with dense gradients, and 1.1-1.7× improvement than the existing Top-k S-SGD.

20 Claims, 17 Drawing Sheets

(56) References Cited

U.S. PATENT DOCUMENTS

| | | | | |
|---|---|---|---|---|
| 2018/0307986 A1* | 10/2018 | Kabul | .................. | G06N 3/0454 |
| 2018/0314940 A1* | 11/2018 | Kundu | .................. | G06N 3/0454 |
| 2018/0322385 A1* | 11/2018 | Yehezkel Rohekar | ...................... G06N 7/005 | |
| 2018/0322387 A1* | 11/2018 | Sridharan | ................ | G06N 3/04 |
| 2019/0138934 A1* | 5/2019 | Prakash | .................. | G06N 3/08 |
| 2020/0082264 A1* | 3/2020 | Guo | ........................ | G06N 3/084 |
| 2021/0374503 A1* | 12/2021 | Kim | ...................... | H03M 7/702 |

OTHER PUBLICATIONS

Big Data Deep Learning: Challenges and Perspectives—2014 (Year: 2014).*

A CG-based Poisson Solver on a GPU-Cluster—2010 (Year: 2010).*

Using Multiprocessor Systems in Scientific Applications—1985 (Year: 1985).*

Scale-Out Acceleration for Machine Learning—2017 (Year: 2017).*

Rajeev Thakur et al., "Optimization of Collective Communication Operations in MPICH.", The International Journal of High Performance Computing Applications, 2005, vol. 19, No. 1, pp. 49-66.

Nikko Strom, "Scalable Distributed DNN Training Using Commodity GPU Cloud Computing.", Sixteenth Annual Conference of the International Speech Communication Association, 2015, pp. 1488-1492.

Alham Fikri Aji et al., "Sparse Communication for Distributed Gradient Descent.", Proceedings of the 2017 Conference on Empirical Methods in Natural Language Processing, 2017, pp. 440-445.

Yujun Lin et al., "Deep Gradient Compression: Reducing the Communication Bandwidth for Distributed Training.", International Conference on Learning Representations, 2018.

Cedric Renggli et al., "SparCML: High-Performance Sparse Communication for Machine Learning.", The International Conference for High Performance Computing, Networking, Storage and Analysis (SC'19), 2019.

* cited by examiner

SYSTEM FOR EFFICIENT LARGE-SCALE DATA DISTRIBUTION IN DISTRIBUTED AND PARALLEL PROCESSING ENVIRONMENT

FIELD OF THE INVENTION

The present invention relates to a system for efficient large-scale data distribution and parallel processing environment. In particular, the present invention relates to global Top-k sparsification for low bandwidth networks.

BACKGROUND OF THE INVENTION

Distributed synchronous stochastic gradient descent (S-SGD) with data parallelism has been widely used in training large-scale deep neural networks (DNNs), but it typically requires very high communication bandwidth between computational workers (e.g., GPUs) to exchange gradients iteratively. Recently, Top-k sparsification techniques have been proposed to reduce the volume of data to be exchanged among workers and thus alleviate the network pressure. Top-k sparsification can zero-out a significant portion of gradients without impacting the model convergence. However, the sparse gradients should be transferred with their indices, and the irregular indices make the sparse gradients aggregation difficult. Current methods that use AllGather to accumulate the sparse gradients have a communication complexity of O(kP), where P is the number of workers, which is inefficient on low bandwidth networks with a large number of workers. It is observed that not all Top-k gradients from P workers are needed for the model update, and therefore propose a novel global Top-k (gTop-k) sparsification mechanism to address the difficulty of aggregating sparse gradients.

With the increase of training data volume and growing complexity of deep neural networks (DNNs), distributed computing environments (such as GPU clusters) are widely adopted to accelerate the training of DNNs. The data-parallel synchronous stochastic gradient descent (S-SGD) method is one of the commonly used optimizers to minimize the objective function of large-scale DNNs. Compared to SGD on a single worker, S-SGD distributes the workloads to multiple workers to accelerate the training, but it also introduces the communication overhead of exchanging model parameters or gradients in each iteration. Assume that there are P workers training a single DNN model with S-SGD. In every iteration, all workers take different mini-batches of data to calculate the model gradients in parallel. Then they need to average the gradients before updating the model parameters, which involves significant data communications. Due to the fact that the computing power of computational units (e.g., GPUs and Google TPUs) grows much faster than the network speed, network communication performance has now become the training bottleneck when the communication-to-computation ratio is high. Many large IT companies use expensive high-speed networks such as 40/100 Gbps IB or Ethernet to alleviate the communication pressure, but still many researchers and small companies can only use consumer-level GPUs connected by low-bandwidth networks such as 1 Gig-Ethernet.

To conquer the communication challenge, one can either increase the workload of workers by choosing a large batch size, or reduce the required data communications in each iteration. Very recently, many large-batch SGD techniques have been proposed with sophisticated optimization strategies to increase the scaling efficiency without losing the model accuracy. On the other hand, gradient sparsification, quantification and compression methods have been proposed to dramatically reduce the size of exchanged gradients without affecting the convergence rate. Among the model/gradient size reduction techniques, the Top-k sparsification is one of the key approaches that can sparsify the gradients to just about 0.001 density (99.9% gradients are zeros and there is no need to transfer these zero-out values).

SUMMARY OF THE INVENTION

Accordingly, it is an objective of the present invention to provide a system for efficient large-scale data distribution in a distributed and parallel processing environment including a set of interconnected processors.

In a first aspect of the present invention, there is provided a system for efficient large-scale data distribution in a distributed and parallel processing environment comprising: a set of interconnected processors executing a plurality of processes, wherein at each of the processes on each of the interconnected processors receives input data defining: a total number (P) of the interconnected processors; an identifier (g) identifying the interconnected processor where the process is executed thereon; a set (G) of sparsified gradients data at the interconnected processor; and a total number (k) of non-zero elements in the set (G) of sparsified gradients data; and wherein each of the processes further comprises: initializing a set (mask) of zero data of the same dimension as the set (G) of sparsified gradients data; extracting the non-zero elements in the set of sparsified gradients data into a first data array and the indices of the non-zero elements in the set of sparsified gradients into a second data array (I); appending the second data array to the end of the first data array to form a data array (sends); setting the zero data in the set (mask) of zero data at the indices of non-zero elements in the set of sparsified gradients to 1; initializing a data array (recvs) of the same dimension as the data array (sends) to receive data from one other processor in the plurality of interconnected processors; initializing a data array (peerMasks) of size P; and initializing the each of the processes on each of the interconnected processors to perform nRounds times, wherein nRounds equals to $\log_2 P$, for each iteration of each of the processes on each of the interconnected processors until nRounds rounds of iterations. A first processor and a second processor of the interconnected processors are chosen to exchange data with each other, the first processor is peerDistance away from the second processor, and the peerDistance is $2^{i-1}$ away with i increases at each iteration from 1 to nRounds. The plurality of the interconnected processors collectively process input information at least by exchanging of the data between the first and second processors, so as to generate and output result.

In the first embodiment of the first aspect of the present invention there is provided a system for efficient large-scale data distribution in a distributed and parallel processing environment including a set of interconnected processors wherein for each iteration of the each processes on each processors until nRounds rounds of iterations the interconnected processors with an identifier (g) will transmit the data array, (sends), to another processor of the interconnected processors with an identifier (peer) wherein peer is equal to peerMasks[g]×$2^{i-1}$+g with i increases at each iteration from 1 to nRounds, and wherein peerMasks is not updated before the first iteration and only updated at the end of each iteration in accordance to the peerDistance.

In the second embodiment of the first aspect of the present invention there is provided a system for efficient large-scale data distribution in a distributed and parallel processing environment including a set of interconnected processors wherein for each iteration of the each processes on each of the interconnected processors until nRounds rounds of iterations one of the interconnected processors with the identifier (g) receives the data array from another processor of the interconnected processors with an identifier (peer) wherein peer is equal to peerMasks[g]$\times 2^{i-1}$+g with i increases at each iteration from 1 to nRounds, and store in the data array (recvs).

In the third embodiment of the first aspect of the present invention there is provided a system for efficient large-scale data distribution in a distributed and parallel processing environment including a set of interconnected processors wherein the data array (recvs) in each of the processes on each of the interconnected processors until nRounds rounds of iterations is split into a non-zero gradients array, ($V^{peer}$) and an indices array, ($I^{peer}$).

In the fourth embodiment of the first aspect of the present invention there is provided a system for efficient large-scale data distribution in a distributed and parallel processing environment including a set of interconnected processors wherein each processes on each of the interconnected processors until nRounds rounds of iterations, the system first adds the non-zero gradients array, ($V^{peer}$), to the set (G), of sparsified gradients data at said interconnected processor to form a set (G'), of expanded sparsified gradients data, followed by selecting the top non-zero absolute values of k gradient data elements in the set (G'), and storing these k gradient data elements in a data array ($V^{local}$) and storing the corresponding indices of these k gradient data elements in a data array ($I^{local}$).

In the fifth embodiment of the first aspect of the present invention there is provided a system for efficient large-scale data distribution in a distributed and parallel processing environment including a set of interconnected processors wherein the data in the set (mask) set to 1 at the corresponding indices in the data array which are not in $I^{local}$ to 0 and the mask[I\$I^{local}$] is equal to 0.

In the sixth embodiment of the first aspect of the present invention there is provided a system for efficient large-scale data distribution in a distributed and parallel processing environment including a set of interconnected processors wherein the data array (sends) in each process on each processor at each iteration from 1 to nRounds is set to the values of the appended arrays of [$V^{local}$, $I^{local}$].

In the seventh embodiment of the first aspect of the present invention there is provided a system for efficient large-scale data distribution in a distributed and parallel processing environment including a set of interconnected processors wherein a set (G'') of sparsified gradients data at said interconnected processor is set at the values of $V^{local}$.

In the eighth embodiment of the first aspect of the present invention there is provided a system for efficient large-scale data distribution in a distributed and parallel processing environment including a set of interconnected processors wherein after the nRounds iterations each of the processors returns the set (G'') of sparsified gradients data and the set (mask) of indices.

In the ninth embodiment of the first aspect of the present invention there is provided a system for efficient large-scale data distribution in a distributed and parallel processing environment including a set of interconnected processors, further comprising a deep neural networks (DNNs) training server or cluster configured to process distributed training of DNNs with synchronized stochastic gradient descent algorithms, wherein the interconnected processors collectively process the set of sparsified gradients, and the result information is used to update model parameter of the DNNs at each iteration.

In a second aspect of the present invention, there is provided a method for efficient large-scale data distribution in a distributed and parallel processing environment comprising: executing a plurality of processes by a set of interconnected processors, wherein at each of the processes on each of the interconnected processors receives input data defining: a total number (P) of the interconnected processors; an identifier (g) identifying the interconnected processor where the process is executed thereon; a set (G) of sparsified gradients data at the interconnected processor; and a total number (k) of non-zero elements in the set (G) of sparsified gradients data; wherein each of the processes further comprises: initializing a set (mask) of zero data of the same dimension as the set (G) of sparsified gradients data; extracting the non-zero elements in the set of sparsified gradients data into a first data array and the indices of the non-zero elements in the set of sparsified gradients into a second data array (I); appending the second data array to the end of the first data array to form a data array (sends); setting the zero data in the set (mask) of zero data at the indices of non-zero elements in the set of sparsified gradients to 1; initializing a data array (recvs) of the same dimension as the data array (sends) to receive data from one other processor in the plurality of interconnected processors; initializing a data array (peerMasks) of size P; and initializing each of the processes on each of the interconnected processors to perform nRounds times, wherein nRounds equals to $\log_2 P$, for each iteration of each of the processes on each of the interconnected processors until nRounds rounds of iterations; wherein the method further comprises: choosing a first processor and a second processor of the interconnected processors to exchange data with each other, wherein the first processor is peerDistance away from the second processor, and the peerDistance is $2^{i-1}$ away with i increases at each iteration from 1 to nRounds; and processing input information comprising at least exchanging data between the first and second processors by the plurality of the interconnected processors collectively, so as to generate and output result.

In the first embodiment of the second aspect of the present invention there is provided a method for efficient large-scale data distribution in a distributed and parallel processing environment including a set of interconnected processors wherein for each iteration of each of the processes on each of the processors until nRounds rounds of iterations one of the interconnected processors with the identifier (g) transmits the data array (sends) to another processor of the interconnected processors with an identifier (peer), wherein peer is equal to peerMasks[g]$\times 2^{i-1}$+g with i increases at each iteration from 1 to nRounds, and wherein peerMasks is not updated before the first iteration and only updated at the end of each iteration in accordance to the peerDistance.

In the second embodiment of the second aspect of the present invention there is provided a method for efficient large-scale data distribution in a distributed and parallel processing environment including a set of interconnected processors wherein for each iteration of each of the processes on each of the interconnected processors until nRounds rounds of iterations one of the interconnected processors with the identifier (g) receives the data array from another processor of the interconnected processors with an identifier (peer), wherein peer is equal to peerMasks[g]$\times 2^{i-1}$+g with i increases at each iteration from 1 to nRounds, and is stored in the data array (recvs).

In the third embodiment of the second aspect of the present invention there is provided a method for efficient large-scale data distribution in a distributed and parallel processing environment including a set of interconnected processors wherein the data array (recvs) in each of the processes on each of the interconnected processors until nRounds rounds of iterations is split into a non-zero gradients array ($V^{peer}$) and an indices array ($I^{peer}$).

In the fourth embodiment of the second aspect of the present invention there is provided a method for efficient large-scale data distribution in a distributed and parallel processing environment including a set of interconnected processors wherein in each of the processes on each of the interconnected processors until nRounds rounds of iterations, the system first adds the non-zero gradients array ($V^{peer}$) to the set (G) of sparsified gradients data at said interconnected processor to form a set (G') of expanded sparsified gradients data, followed by selecting the top non-zero absolute values of k gradient data elements in the set (G') and storing the k gradient data elements in a data array ($V^{local}$) and storing the corresponding indices of the k gradient data elements in a data array ($I^{local}$).

In the fifth embodiment of the second aspect of the present invention there is provided a method for efficient large-scale data distribution in a distributed and parallel processing environment including a set of interconnected processors wherein the data in the set (mask) having been set to 1 at the corresponding indices in the data array which are not in $I^{local}$ is set to 0 and the mask[I\$I^{local}$] is equal to 0.

In the sixth embodiment of the second aspect of the present invention there is provided a method for efficient large-scale data distribution in a distributed and parallel processing environment including a set of interconnected processors wherein the data array (sends) in each of the processes on each of the processors at each iteration from 1 to nRounds is set to the values of the appended arrays of [$V^{local}$, $I^{local}$].

In the seventh embodiment of the second aspect of the present invention there is provided a method for efficient large-scale data distribution in a distributed and parallel processing environment including a set of interconnected processors wherein a set (G") of sparsified gradients data at said interconnected processor is set at the values of $V^{local}$.

In the eighth embodiment of the second aspect of the present invention there is provided a method for efficient large-scale data distribution in a distributed and parallel processing environment including a set of interconnected processors wherein after the nRounds iterations each of the processors returns the set (G") of sparsified gradients data and the set (mask) of indices.

In the ninth embodiment of the second aspect of the present invention there is provided a method for efficient large-scale data distribution in a distributed and parallel processing environment including a set of interconnected processors, wherein further comprising: processing distributed training of deep neural networks (DNNs) with synchronized stochastic gradient descent algorithms by a DNNs training server or cluster, wherein the interconnected processors collectively process the set of sparsified gradients, and the result information is used to update model parameter of the DNNs at each iteration.

Those skilled in the art will appreciate that the invention described herein is susceptible to variations and modifications other than those specifically described.

The present invention includes all such variation and modifications. The invention also includes all of the steps and features referred to or indicated in the specification, individually or collectively, and any and all combination or any two or more of the steps or features.

Throughout the present specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the present invention.

Furthermore, throughout the present specification and claims, unless the context requires otherwise, the word "include" or variations such as "includes" or "including", will be understood to imply the inclusion of a stated integer or group of integers but not the exclusion of any other integer or group of integers.

Other definitions for selected terms used herein may be found within the detailed description of the present invention and apply throughout. Unless otherwise defined, all other technical terms used herein have the same meaning as commonly understood to one of ordinary skill in the art to which the invention belongs.

Other aspects and advantages of the present invention will be apparent to those skilled in the art from a review of the ensuing description.

BRIEF DESCRIPTION OF THE DRAWINGS

The above and other objects and features of the present invention will become apparent from the following description of the invention, when taken in conjunction with the accompanying drawings, in which.

DETAILED DESCRIPTION OF THE INVENTION

Figure 1:
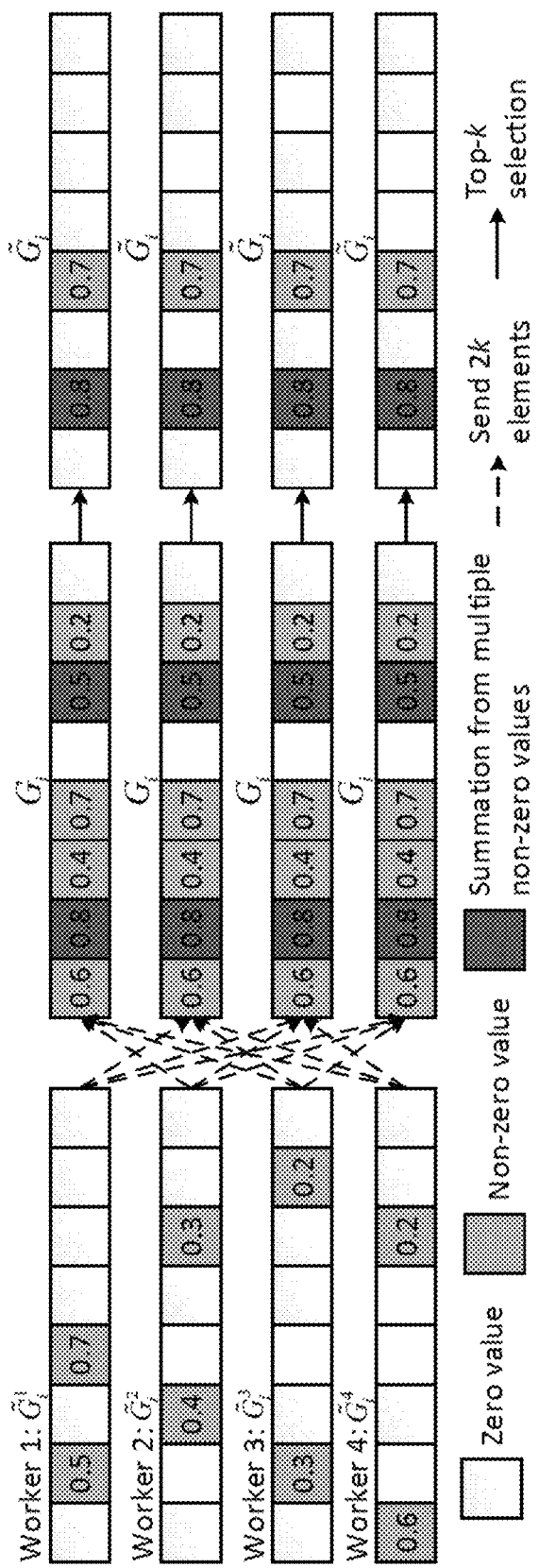
FIG. 1 shows an example of gTop-k using AllGather on 4 workers, and k=2.

The present invention is not to be limited in scope by any of the specific embodiments described herein. The following embodiments are presented for exemplification only.

Top-k sparsification has been a key gradient compression method with empirical and theoretical studies, in which researchers have verified that only a small number of gradients are needed to be averaged during the phase of gradient aggregation without impairing model convergence or accuracy. However, the sparsified gradients are generally associated with irregular indices, which makes it a challenge to efficiently accumulate the selected gradients from all workers. The ring-based AllReduce method used on dense gradients (DenseAllReduce) has an O(P+m) communication complexity, where P is the number of workers and m is the size of parameters (or gradients). In Top-k sparsification, assume that the density of gradients is $\rho$ on each worker, the value of $k=\rho\times m$, and the corresponding indices of non-zero values are irregular from different workers and iterations, thus it generally needs to transfer 2k number of values (gradients and indices) in each iteration. Note that the gradient sparsification method is not suitable for the parameter server (PS) based S-SGD because the workers should pull the whole model without any compression/sparsification in every iteration, whilst decentralized S-SGD with AllReduce can be better for gradient compression. However, with the sparse gradients, the DenseAllReduce method cannot be directly used to accumulate all the sparse gradients with irregular indices, and recent solutions use the AllGather collective, which is inefficient even if $\rho=0.001$.

The AllGather collective has an $O((P-1)m\rho)$ communication complexity. TopKAllReduce is used in the present invention to denote the method of averaging irregularly indexed Top-k gradients by adopting AllGather. When scaling to a large number of workers (i.e., P is large), even high sparsification ratios still generate significant communication overhead.

In fact, the main idea of Top-k sparsification is based on the fact that gradients with larger absolute values can contribute more to the model convergence. It is observed that one can further select Top-k gradients from the accumulated results from P groups of Top-k values generated by P workers. In other words, even though P workers can generate a maximum number of P×k non-zero gradients to model update, the Top-k gradients (in terms of absolute values) can be picked up for the model update in each iteration. Based on this observation, an efficient Top-k sparsification method to tackle the difficulty of TopKAllReduce without affecting the model convergence is provided in the present invention. Specifically, instead of accumulating the irregularly indexed non-zero gradients from all workers, the global Top-k (gTop-k) gradients in terms of absolute values is chosen in the present invention. gTop-k can elegantly make use of a tree structure to select the global Top-k values from all workers, which is called gTopKAllReduce in the present invention, such that the communication complexity is reduced from O(Pmp) to $O(\log_2(P)m\rho)$. The communication complexities of different gradient aggregation solutions are summarized in Table 1.

TABLE 1

Communication complexity of gradient aggregation algorithms

| Aggregation Algorithm | Complexity | Time Cost |
|---|---|---|
| DenseAllReduce | O (m) | $2(P-1)\alpha + 2\dfrac{P-1}{P}m\beta$ |
| TopKAllReduce | O (kP) | $\log_2(P)\alpha + 2(P-1)k\beta$ |
| gTopKAllReduce | O (klog$_2$P) | $\log_2(P)\alpha + 2k\log_2(P)\beta$ |

Note:
$k = \rho \times m$. $\alpha$ and $\beta$ are machine dependent and constant on a specific machine.

In the present invention, the gTopKAllReduce algorithm is first implemented, which provides much more efficient global Top-k sparse gradients summation from distributed workers. Then the proposed gTopKAllReduce to gTop-k S-SGD under PyTorch is integrated, which is one of the most popular deep learning frameworks and MPI. On a 32-node GPU cluster connected by 1-Gbps Ethernet, gTop-k S-SGD achieves 2.7-12.8× speedup than S-SGD with highly optimized libraries Horovod and NCCL. Compared to Top-k S-SGD, gTop-k S-SGD is generally up to 1.5 times faster on the evaluated experiments on various DNNs and datasets. The contributions in the present invention are summarized as follows:

- It is observed that the accumulating results of Top-k sparsification can be further sparsified before being updated to the model.
- An efficient global Top-k sparsification algorithm on distributed SGD, called gTop-k S-SGD, is provided to accelerate distributed training of deep neural networks without losing the model convergence and accuracy.
- The proposed gTop-k S-SGD atop popular framework PyTorch and MPI is implemented, and all the experimental parameters of the present invention are also released for reproducibility.

gTop-k S-SGD achieves significant improvement on the real-world applications with various DNNs and datasets under low-bandwidth networks (e.g., 1 Gbps Ethernet).

1. Preliminaries

In this section, the background knowledge in training of DNNs, and the distributed SGD used for large-scale models, are briefly introduced. The current Top-k sparsification technique for compressing gradients in distributed SGD is also illustrated. For ease of presentation, some frequently used notations are summarized in Table 2.

TABLE 2

Frequently used notations

| Notation | Description |
| --- | --- |
| P | The number of workers in the cluster. |
| m | The size of a message in bytes. |
| α | Latency (startup time) of the network between two workers. |
| β | Transmission time per byte between two nodes. |
| ρ | Density of the gradients for aggregation. |
| k | The size of gradients to aggregation, and k = ρ × m. |
| $t_{iter}$ | Time of an iteration. |
| $t_f$ | Time of the forward pass in each iteration. |
| $t_b$ | Time of the backward propagation in each iteration. |
| $t_u$ | Time of the model update in each iteration. |
| $t_c$ | Time of communication cost in each iteration. |

DNNs

Deep neural networks (DNNs) are generally stacked with many hierarchical layers, and each layer is a transformer function of the input values. The DNNs can be formulated as Eq. 1.

$$a^{(l)} = f(W^{(l)}, x^{(l)}), \quad (1)$$

where $x^{(l)}$ and $a^{(l)}$ are the input and output of layer l (l=1, 2, ..., n−1, n for n-layer DNNs) respectively. Inputs of current layer are the outputs of its previous layer(s) (e.g., $x^l = a^{(l-1)}$). The function $f$ is the transformer function which consists of an operation (e.g., inner product or convolution) and an activation function (e.g., ReLU). $W^{(l)}$ are the trainable model parameters, which could be iteratively updated during the model training using mini-batch stochastic gradient descent (SGD) optimizers and the backpropagation algorithm.

Mini-Batch SGD

There is an objective function $\mathcal{L}(W,D)$ to define the differences between the prediction values and the ground truth of a DNN. The mini-batch SGD optimizer updates the parameters iteratively to minimize the objective function. To be specific, there are three phases in each iteration during training: 1) Feed-forward phase: a mini-batch of data $D_i$ ($D_i \subset D$) is read as inputs of a DNN, and $D_i$ is fed forward across the neural network from the first layer to the last layer, which finally generates the prediction values to be used as evaluation of the objective function $\mathcal{L}(W,D)$·2) Backward-propagation phase: the gradients with respect to parameters and inputs are calculated from the last layer to the first layer. 3) Update phase, the parameters are updated by the afore-generated gradients using the following formula:

$$W_{i+1} = W_i - \eta \cdot \nabla \mathcal{L}(W_i, D_i), \quad (2)$$

where η is the learning rate. For a single-worker training, phase 1) and 2) are the main time costs of an iteration, which are computing intensive tasks. So the average time of one iteration can be approximated by $t_{iter} = t_f + t_b$.

Synchronized SGD

Synchronized SGD (S-SGD) with data parallelism is widely applied to train models with multiple workers (say P workers, and indexed by g). Each worker keeps a consistent model and takes a different mini-batch of data $D_i^g$ and forwards it by phase 2), and then follows phase 3) to calculate the gradients $\nabla \mathcal{L}(W_i, D_i^g)$ in parallel. Since the data read by different workers are not the same, the generated gradients are inconsistent in each iteration; therefore, to keep explicit the same as mini-batch SGD, the gradients from different workers should be averaged before updating the model. The update formula of parameters is rewritten as $$W_{i+1} = W_i - \eta \frac{1}{P} \sum_{g=1}^{P} \nabla \mathcal{L}(W_i, D_i^g) = W_i - \eta \frac{1}{P} \sum_{g=1}^{P} G_i^g, \quad (3)$$

where $G_i^g = \nabla \mathcal{L}(W_i, D_i^g)$ denotes the gradients of worker g at the $i^{th}$ iteration. The gradients are located in different workers without shared memory so that the averaging operation of gradients involves communication costs, which generally becomes the system bottleneck. The average iteration time of S-SGD can be approximated by $t_{iter} = t_f + t_b + t_c$. Assuming that weak-scaling on P workers is used with S-SGD, the scaling efficiency can be approximated by $$e = \frac{t_f + t_b}{t_f + t_b + t_c}. \quad (4)$$

$t_c$ is generally related to P and the model/gradient size m. Therefore, with larger P, it is crucial to reduce m to achieve lower $t_c$ and thus higher scaling efficiency.

DenseAllReduce

In Eq. 3, the summation of $G_i^g$ (i.e., $\Sigma_{g=1}^P G_i^g$) can be directly implemented by an AllReduce collective, which the DenseAllReduce is denoted. And the ring-based AllReduce algorithm (which is also included in NCCL) is an efficient implementation on the dense-GPU cluster. To understand the time cost of DenseAllReduce, the time model of the ring-based AllReduce is revisited. The time cost of ring-based AllReduce can be represented by $$t_c^{dar} = 2(P-1)\alpha + 2\frac{P-1}{P}m\beta, \quad (5)$$

where α is the latency (startup time) of a message transfer between two nodes, and β is the transmission time per byte between two nodes using the alpha-beta communication model.

Algorithm 1: S-SGD with Top-k sparsification on worker g

Input:
The dataset: D
The initialized weights: W
The mini-batch size per worker: B
The number of workers: P
The number of iterations to train: N
The number of gradients to select: k
  1:    $G_0^g = 0$;
  2:    for i = 1 → N do
  3:        Sampling a mini-batch of data $D_i^g$ from D;
  4:        $G_i^g = G_{i-1}^g + \nabla \mathcal{L}(W_i, D_i^g)$;
  5:        Select threshold thr = the $k^{th}$ largest value of $|G_i^g|$;

-continued

Algorithm 1: S-SGD with Top-k sparsification on worker g

```
6:    Mask = |G_i^g| > thr;
7:    G̃_i^g = G_i^g ⊙ Mask; // Mask has k non-zero values
8:    G_i^g = G_i^g ⊙ ¬Mask; // Store the residuals
9:    
      G_i = TopKAllReduce(G̃_i^g); //G_i = (1/P) ∑_{g=1}^P G̃_i^g 10:   W_i = W_{i-1} − ηG̃_i;
11:   end for // line 2
12:   procedure TopKAllReduce(G̃_i^g)
13:   [V_i^g, J_i^g] = G̃_i^g;
14:   [V, I] = AllGather([V_i^g, I_i^g]);
15:   G_i = G̃_i^g;
16:   for g = 0 → P-1 do
17:     G_i[I[g × P: g × (P + 1)]] + = V[g × P: g × (P + 1)];
18:   end for // line 16
19:   G_i = G_i/P;
20:   Return G_i;
21:   end procedure // line 12
```

Top-k Sparsification

From Eq. 5, it is noted that with P or m becoming large, the communication cost will be linearly increased. To reduce the size of transfer messages m, Top-k sparsification is proposed to introduce very highly sparse of gradients. Using Top-k sparsification, each worker only needs to contribute the k largest absolute values of gradients $G_i^g$ to be summed up in each iteration, and the zeroed-out values of gradients are stored locally and accumulated at the next iteration. Both theoretical and empirical studies have verified that the Top-k sparsification has little impact on the model convergence and accuracy. The pseudo-code of Top-k sparsification S-SGD is shown in Algorithm 1. Note that at Line 9 of Algorithm 1, the implementation of TopKAllReduce is completely different from the DenseAllReduce for efficiency since the non-zero values of $\tilde{G}_i^g$ may come from inconsistent indices $J_i^g$ from different workers. Efficient implementations of such sparse AllReduce are non-trivial. Current methods are using AllGather to implement TopKAllReduce, in which the sparsified gradients are gathered as a dense vector combined with its corresponding indices, say $\tilde{G}_i^g = [V_i^g, J_i^g]$. Both sizes of $V_i^g$ and $J_i^g$ are k. According the communication model of AllGather, the time cost for all-gathering 2k size of messages is $$t_c^{tar} = \log_2(P)\alpha + 2(P-1)k\beta. \quad (6)$$

From Eq. 6, it can be seen that with increasing P, $t_c^{tar}$ is linear increased. Therefore, Top-k sparsification is also difficult to scaling large-scale clusters on low-bandwidth networks. In the present invention, a global Top-k (gTop-k) sparsification approach is provided to address the problem.

2. Methodology

In this section, some observations from Top-k sparsification S-SGD are first demonstrated, followed by presenting the proposed global Top-k sparsification algorithm. For ease of presentation, it is assumed that the number of workers P is the power of 2.

Observations from Top-k Sparsification

In the previous section, the Top-k sparsification S-SGD has been introduced, in which there are k values selected from the local worker and then are accumulated across all the workers. The distribution of non-zero values (denoted as $\mathcal{G}_i$) of $G_i$ which is generated by the summation of the sparse gradients from all workers is observed in this section. It is found that not all values of $\mathcal{G}_i$ (whose number of elements is $\mathcal{K}$, and k ≤ $\mathcal{K}$ ≤ m) contributes to the model convergence.

Specifically, $\mathcal{G}_i$ can be further sparsified as $\tilde{\mathcal{G}}_i$ such that only a smaller number of non-zero gradients are needed for model updates. In other words, one can further select Top-k largest absolute values, $\tilde{\mathcal{G}}_i$, from $\mathcal{G}_i$ to update the model while maintaining the model convergence. In this scenario, the selected $\tilde{\mathcal{G}}_i$ from $\mathcal{G}_i$ results in $\mathcal{K}$−k afore-summed gradients that are neither updated to the model nor stored into the local residuals. This finally could damage the model convergence. Therefore, if only k elements are selected from g, to update the model, the remain $\mathcal{K}$−k elements should be put back as residuals with corresponding indices so that they can be accumulated locally and should contribute to model updates in future iterations. Therefore, it could have $E(\hat{\mathcal{G}}_i) = E(\mathcal{G}_i)$ to ensure the convergence of gTop-k.

Algorithm 2: Naïve version S-SGD with gTop-k on worker g

```
Input:
The dataset: D
The initialized weights: W
The mini-batch size per worker: B
The number of workers: P
The number of iterations to train: N
The number of gradients to select: k
   1:   G_0^g = 0;
   2:   for i = 1 → N do
   3:     Sampling a mini-batch of data D_i^g from D;
   4:     G_i^g = G_{i-1}^g + ∇L(W_i, D_i^g);
   5:     Select threshold thr = the k^{th} largest value of |G_i^g|;
   6:     Mask = |G_i^g| > thr;
   7:     G̃_i^g = G_i^g ⊙ Mask; // Mask has k non-zero values
   8:     G_i^g = G_i^g ⊙ ¬Mask; // Store the residuals
   9:     
          G_i = SparseAllReduce(G̃_i^g); //G_i = (1/P) ∑_{g=1}^P G̃_i^g 10:     // At this time all workers have consistent G_i
  11:     Select global threshold gThr = the k^{th} largest value of |G_i|;
  12:     gMask = |G_i| > gThr;
  13:     Ĝ_i = G_i ⊙ gMask;
  14:     G_i^g + = G̃_i^g ⊙ ¬gMask ⊙ Mask; //Store extra residuals
  15:     W_i = W_{i-1} − ηĜ_i;
  16:   end for // line 2
```

The Key Idea of gTop-k

According to the above observations, it only needs k largest absolute values from all the sparsified gradients $G_i^g$, where g=1, 2, . . . , P. Therefore, the problem is formulated as the global Top-k (gTop-k) selection from $G_i$ instead of TopKAllReduce, while $\tilde{G}_i^g$ are located in distributed workers. It is again to let $[V_i^g, J_i^g]$ denote the non-zero values and corresponding indicies of $\tilde{G}_i^g$ whose number of non-zero values is k. The AllGather version is first used to illustrate the key idea of gTop-k sparsification, followed by presenting the efficient algorithm for gTop-k sparsification. At Line 10 of Algorithm 1, $W_i = W_{i-1} - \eta G_i$, $G_i$ with $\mathcal{K}$ non-zero values contributing updates to $W_i$. Different from top-k sparsification, $G_i$ is further sparsified by selecting k largest absolute values from $G_i$. The straightforward implementation of gTop-k is shown in Algorithm 2. It is noted that this version is only used to illustrate the key idea that how to select those gradients to update the model. The efficient algorithm is presented afterward in the next subsection. An example of gTop-k sparsification using AllGather on 4 workers is shown in FIG. 1.

gTopKAllReduce: An Efficient AllReduce Algorithm for gTop-k Sparsification

From Eq. 6, it can be seen that the AllGather collective is inefficient to conduct the AllReduce operation from irregular indexed gradients. Based on the same density, the main purpose of the present efficient algorithm is to eliminate the high impact of the variable P on the time cost. For ease of presentation, it is first defined a Top-k operation, T, of two sparse vectors, say $\tilde{G}^a$ and $\tilde{G}^b$, both of which have k non-zero values.

Definition 1 A Top-k operation: T. $\tilde{G}^{a,b}=\tilde{G}^a T \tilde{G}^b=$mask $\lfloor(\tilde{G}^a+\tilde{G}^b)$, where mask=$|\tilde{G}^a+\tilde{G}^b|>$thr, and thr=the $k^{th}$ largest value of $|\tilde{G}^a+\tilde{G}^b|$ Note that the number of non-zero values of $\tilde{G}^{a,b}$ is also k. During training of S-SGD, $\tilde{G}^a$ and $\tilde{G}^b$ are located in different workers without shared memory. One should exchange the two sparse vectors to achieve an global Top-k sparse vector: $\tilde{G}^{a,b}$. The operation for two distributed workers is shown in FIG. 2, which demonstrates that T can be efficiently implemented by a send operation (network communication), followed by a local Top-k selection on a maximum number of 2k non-zero values.

Figure 2:
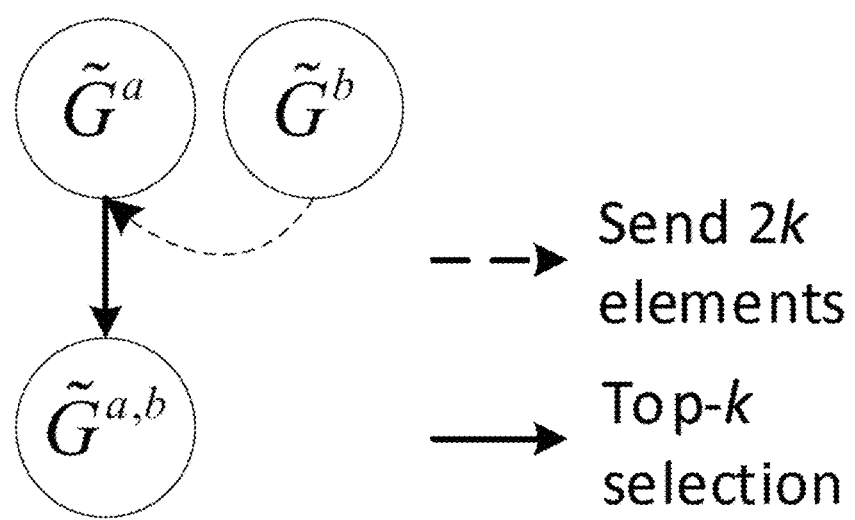
FIG. 2 shows an implementation of T for two distributed sparse vectors $G^{\hat{}\hat{}}a$ and $G^{\hat{}\hat{}}b$. The second worker ([$V^{\hat{}}b$, $I^{\hat{}}B$]= $G^{\hat{}\hat{}}B$) with k non-zero elements ($V^{\hat{}}b$) combined with k indices ($I^{\hat{}}b$) sends [$V^{\hat{}}b,I^{\hat{}}B$] to the first worker, and then the first worker has the information of indices to add the values received from the second worker, i.e., $G^{\hat{}\hat{}}a+G^{\hat{}\hat{}}B$, and the first worker easily computes $G^{\hat{}\hat{}}(a,b)=G^{\hat{}\hat{}}aTG^{\hat{}\hat{}}b$ according to Definition 1.
Figure 3:
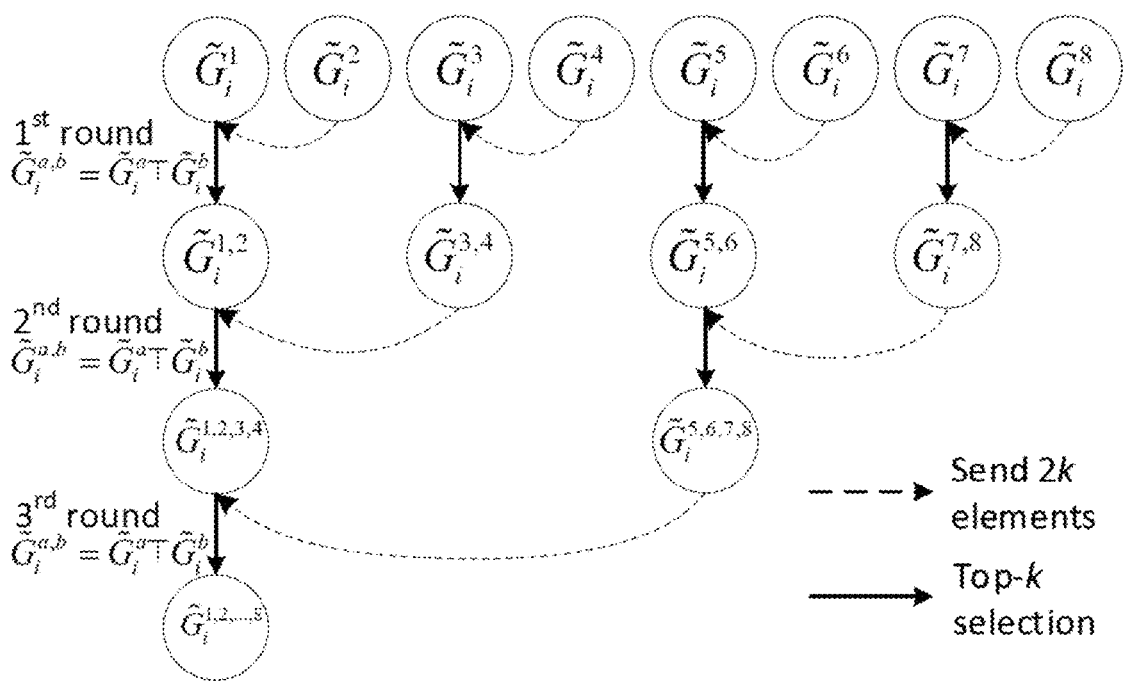
FIG. 3 shows an example of gTop-k for 8 distributed sparse vectors $G^{\hat{}\hat{}}1$, $G^{\hat{}\hat{}}2$, . . . , $G^{\hat{}\hat{}}8$. I.e., $G^{\hat{}}=G^{\hat{}\hat{}}(1, 2, \ldots, 8)=G^{\hat{}\hat{}}1TG^{\hat{}\hat{}}2T \ldots G^{\hat{}\hat{}}8$. It only requires $\log_2 P=\log_2 8=3$ rounds of network communications to select the global Top-k.

When scaling to P workers (assume that P is the power of 2), since the final k is equal to the local k, a recursive technique is used to reduce the total transfer size. To show this recursive procedure used for gTop-k, an 8-worker example in selecting the global Top-k values is shown in FIG. 3. There are 3 rounds of communications for 8 workers (i.e., $\log_2 8=3$). At the $j^{th}$ round, there are $$\frac{P}{2^j}$$

pairs of workers to do the T operations, which is the same as FIG. 2, in parallel. After 3 rounds, the first worker (rank 0) finally generates the global Top-k values (i.e., $\tilde{G}= \tilde{G}^{1, 2, \ldots, 8}=\tilde{G}^1 T \tilde{G}^2 T \ldots \tilde{G}^8$).

According to the illustration of the recursive procedure of gTop-k, the gTop-k based AllReduce, shortly called gTopKAllReduce, is provided. The details of the algorithm are shown as follows.

```
Algorithm 3: gTopKAllReduce: gTop-k selection and communication
Remark: This algorithm is executed on all the devices in parallel. Each device is
identified by a unique ID g.
Input:
            The number of devices: P
            The ID of the concerned device: g; //g = 1,2,...,P
            The set of sparsified gradients at device g: G̃ᵍ; // Each device
maintains a different set of gradients, where each gradient is a floating point number.
Sparsified gradients mean that many of the elements in G̃ᵍ are 0.
            The number of non-zero elements in G̃ᵍ: k // Remark: k is the same for
all devices. The value of k is determined by the sparsification method.
  1:   Initialize array maskᵍ whose size is the same as G̃ᵍ, and its elements are all set
to zero;
  2:   Extract the non-zero elements in G̃ᵍ into array Vᵍ, and their corresponding
indices into array Iᵍ. Generate array sends= {Vᵍ,Iᵍ}, i.e., sends is the
combination of Vᵍand Iᵍ.
For example: G̃ᵍ = [0, 0, 1.3, 0, 0, 0, −2.4, 3.5, 0, 0]
Then k = 3, Vᵍ = {1.3, −2.4, 3.5}, Iᵍ = {2, 6, 7}, sends = {1.3, −2.4, 3.5, 2, 6, 7}
  3:   for j = 0 → k − 1 do
                   maskᵍ[ Iᵍ[j] ] = 1;
           end for
Remark: for all non-zero gradients, set their corresponding masks to 1
Following the previous example:
maskᵍ = {0, 0, 1, 0, 0, 0, 1, 1, 0, 0}
  4:   Generate an array recvs with the same size of sends;
Remark: recvs will be used to store the data received from other device
  5:   nRounds= log₂P;
Remark: e.g., if the number of devices P is 32, nRounds = 5. The gTop-k algorithm
takes nRounds rounds to finish.
  6:   Generate array peerMasks with size P;
  7:  for i = 1 → nRounds do
  8:             peerDistance = 2^{i−1}; // a device will exchange data with another device.
peerDistance is the distance between the two devices' IDs.
  9:             for j = 1 → P do
 10:                    localRank = (j − 1)%(2 × peerDistance); // % is the modular
operation
 11:                    if localRank < peerDistance then
 12:                           peerMasks[j] = 1;
 13:                    else
 14:                           peerMasks[j] = −1;
 15:                    end if // line 11
 16:             end for // line 9
 17:             peer = peerMasks[g] × 2^{i−1} + g;
// Find the peer with the recursive algorithm, please also refer to FIG. 13
 18:             Send the data in array sends to peer;
// Send the array sends to device with ID peer through the network. Notice that
according to our algorithm, device with ID peer is also sending data to device g.
 19:             Receive data from peer and save into array recvs;
// Receive the data from device with ID peer, and store the data in array recvs
 20:             [Vᵖᵉᵉʳ, Iᵖᵉᵉʳ] = recvs;
// Split array recvs into the non-zero gradients array Vᵖᵉᵉʳ and the indices array Iᵖᵉᵉʳ
 21:             for j = 0 → k − 1 do
                       G̃ᵍ[Iᵖᵉᵉʳ[j]] = G̃ᵍ[Iᵖᵉᵉʳ[j]] + Vᵖᵉᵉʳ[j]
                   end for
// Add the received gradients Vᵖᵉᵉʳ onto its own gradients G̃ᵍ. Notice that, after
accumulation, the number of non-zero values of G̃ᵍ may be as large as 2k
```

```
22:      Select top-k elements from $\tilde{G}^g$ (in terms of absolute values). The value of
         non-zero top-k gradients are stored in array $V^{local}$, and their corresponding indices are
         stored in array $I^{local}$.
23:      $mask^g[I^g \setminus I^{local}] = 0$;
// "\" is the operation of set subtraction
24:      sends = $[V^{local}, I^{local}]$;
25:    end for // line 7
26:    Generate array $\tilde{G}$ to be the same size as $\tilde{G}^g$, and its elements are all zeros;
27:    for j = 0 → k - 1 do
              $\tilde{G}[I^{local}[j]] = V^{local}[j]$
         end for
28:    Return array $\tilde{G}$ and array $mask^g$;
Algorithm 4: gTopKAllReduce based S-SGD on worker g
Input:
                 The dataset: D
                 The initialized weights: W
                 The mini-batch size per worker: B
                 The number of workers: P
                 The number of iterations to train: N
                 The number of gradients to select: k
1:    $G_0^g = 0$;
2:    for i=1 → N do
3:       Sampling a mini-batch of data $D_i^g$ from D;
4:       $G_i^g = G_{i-1}^g + \nabla\mathcal{L}(W_i, D_i^g)$;
5:       Select threshold thr= the $k^{th}$ largest value of $|G_i^g|$;
6:       Mask = $|G_i^g|$ > thr;
7:       $\tilde{G}_i^g = G_i^g \odot$ Mask; // Mask has k non-zero values
8:       $G_i^g = G_i^g \odot \neg$Mask; // Store the residuals
9:       $\tilde{G}_i$,gMask=gTopKAllReduce($\tilde{G}_i^g$, k, P, g);
10:      $G_i^g$ += $\tilde{G}_i^g \odot \neg$gMask $\odot$ Mask; //Store extra residuals
11:      $W_i = W_{i-1} - \eta\tilde{G}_i$;
12:   end for // line 2
```

Communication Complexity Analysis of gTopKAllReduce

There are two main processes of gTopKAllReduce. The first one is the calculation of $\tilde{G}$. From FIG. 3, the first worker should take part in the communication at every round, so it is only needed to analyze the big O of rank 0. In the worker of rank=0, it takes $\log_2 P$ rounds of communications to calculate $\tilde{G}$. In each communication, rank 0 should receive 2k elements from another worker, which takes a time cost of $\alpha+2k\beta$. Thus, the overall time cost of the first process is $\alpha \log_2 P + 2k\beta \log_2 P$. In the second process, the global Top-k values (i.e., $\tilde{G}$) in the first worker should be broadcasted to all the other workers. The broadcast operation takes $\alpha \log_2 P + 2k\beta \log_2 P$ according to the flat-tree algorithm. In summary, the time cost of gTopKAllReduce is $$t_c^{gar} = 2\alpha \log_2 P + 4k\beta \log_2 P. \quad (7)$$

Figure 13:
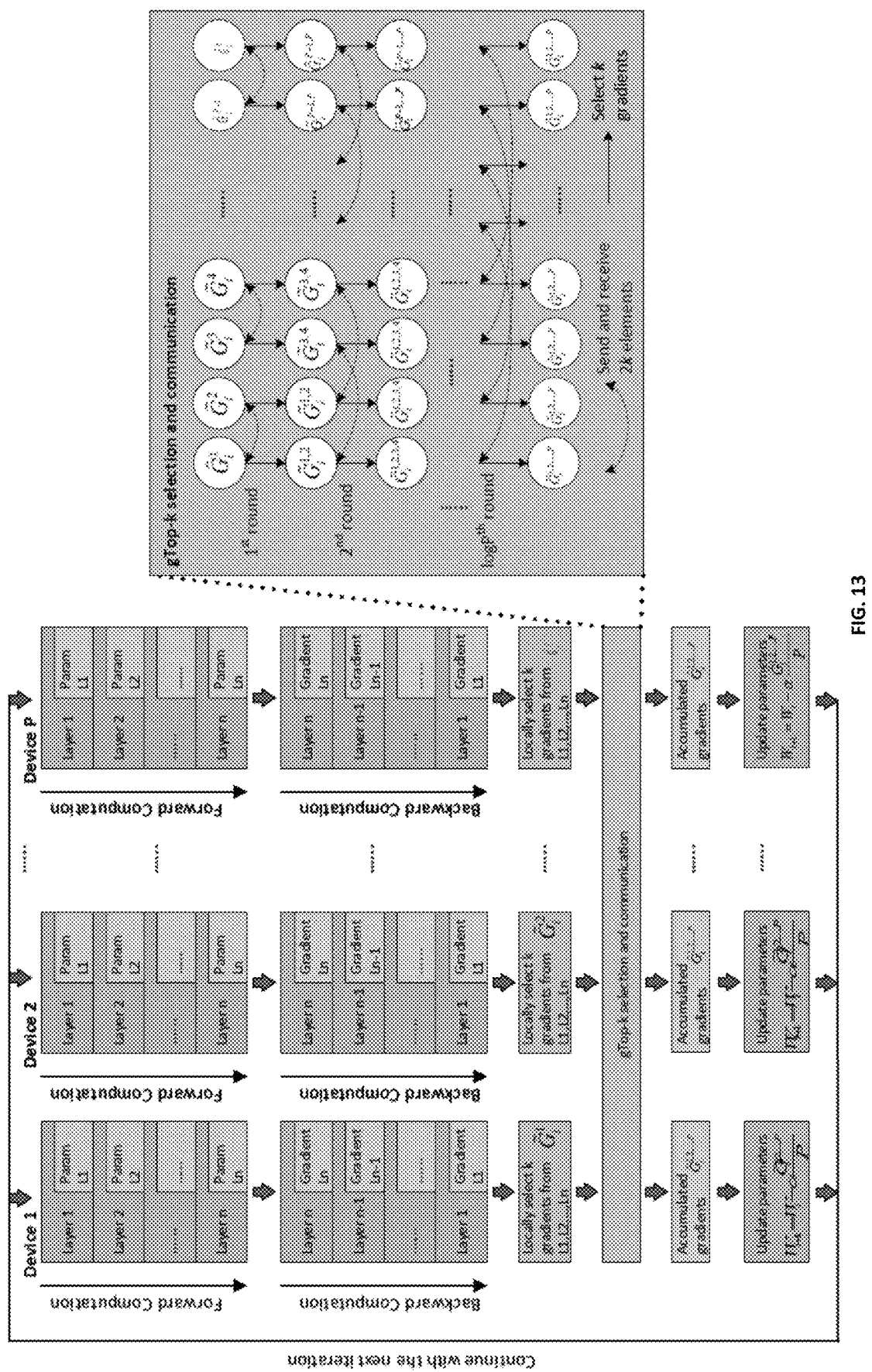
FIG. 13 shows the flowchart of gTop-k S-SGD.

It is noticed that at each communication round, the receiver can also send its data to its peer so that the sender can also receive data from the receiver. In this scenario, at each communication round, every worker is both a receiver and a sender as shown in FIG. 13. If P is not the power of 2, add fake devices to make P be the power of 2. At each round, there are P12 pairs of devices sending and receiving k gradients from their peers. After a device received k gradients from its peer, the device first accumulates the local k gradients with the received k gradients corresponding with the gradient indices. Then the device further selects k gradients (e.g., Top-k or Random-k) for the next round communication. If a device has a fake device peer, then the device keeps unchanged at the current round. Therefore, after the final communication round, all workers have the consistent data so that the broadcast operation is not required. The communication complexity becomes $$t_c^{gar} = \alpha \log_2 P + 2k\beta \log_2 P.$$

The communication complexity is much lower than TopKAllReduce especially when P is large.

gTop-k S-SGD with gTopKAllReduce

With the foregoing efficient implementation of gTopKAllReduce, the present invention improves the gTop-k S-SGD in Algorithm 2 by replacing Line 9-13 with a line that invokes gTopKAllReduce shown Algorithm 3. The improved version of the gTop-k S-SGD training algorithm is shown in Algorithm 4. Compared to Top-k S-SGD, gTop-k S-SGD only introduces an extra computation (Line 10 in Algorithm 4) whose overhead is much smaller than the communication overhead, while gTop-k S-SGD reduces the communication complexity a lot. The flowchart of the process of our proposed gTop-k S-SGD with gTopKAllReduce is shown in FIG. 13. There are P workers training a single model in parallel. At each iteration, P workers do forward computation and backward computation with different input data in parallel simultaneously, which generates the gradients of the model parameters. The gradients are sparsified locally by selecting top-k elements (in terms of absolute values). The sparsified gradients are aggregated by the proposed gTop-k algorithm, which only requires a communication complexity of O(k log P). The gTop-k algorithm selects the global top-k elements from distributed P workers by using a tree-structured recursive algorithm which communicates k elements at each communication round. After the final communication round, each worker has the consistent sparsified gradients to update its model parameters.

System Overview

Figure 4:
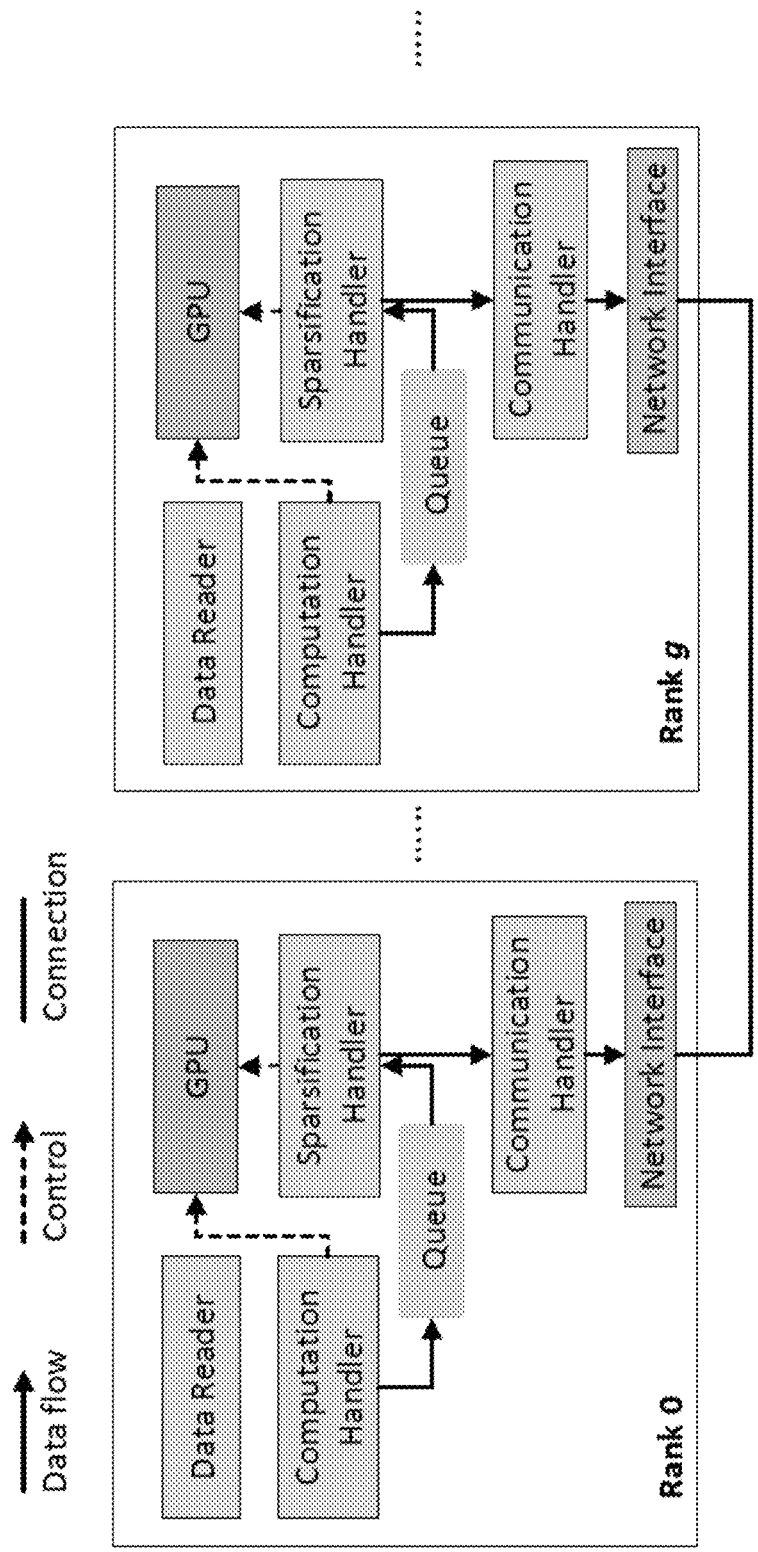
FIG. 4 shows an overview of the gTop-k based distributed training system.

The gTop-k S-SGD atop PyTorch and MPI is implemented in the present invention. The flowchart of gTop-k S-SGD is shown in FIG. 13. Since the sparsification (i.e., Top-k selection in local) and residual operations have extra overheads, and they can be parallelized with the feed-forward and backward computation. Therefore, the gradient sparsification related operations are separated from feed-forward and backward operations. To be specific, there is a thread to process the gradient sparsification and residual management for communication, and the main thread takes charge of feed-forward/backward computation. An overview of the present system architecture is shown in FIG. 4.

The present invention discloses a system for efficient large-scale data distribution in a distributed and parallel processing environment including a set of interconnected processors, comprising a plurality of processes executing on the plurality of interconnected processors; wherein at each process on each processor receives input data defining:
a total number, P, of the interconnected processors;
an identifier, g, identifying said interconnected processor where said process is executing on;
a set, G, of sparsified gradients data at said interconnected processor; and
a total number, k, of the non-zero elements in the set of sparsified gradients data.

The each process further comprises data processing steps as following:
initializing a set, mask, of zero data of the same dimension as the set, G, of sparsified gradients data;
extracting the non-zero elements in the set of sparsified gradients data into a first data array and the indices of the non-zero elements in the set of sparsified gradients into a second data array, I;
appending the second data array to the end of the first data array to form a data array, sends;
setting the zero data in the set, mask, of zero data at the indices of non-zero elements in the set of sparsified gradients to 1;
initializing a data array, recvs, of the same dimension as the data array, sends, to receive data from one other processor in the said plurality of interconnected processors;
initializing a data array, peerMasks, of size P; and
initializing the each process on each processor to perform nRounds times wherein nRounds=$\log_2$ P.

For each iteration of the each process on each processor until nRounds rounds of iterations, wherein each processor in the plurality of interconnected processors will exchange data with one other processor in the said plurality of interconnected processors which is peerDistance away from said each processor wherein said peerDistance is $2^{i-1}$ away with i increases at each iteration from 1 to nRounds. For example, a first processor and a second processor of the interconnected processors can be chosen to exchange data with each other. The first processor is peerDistance away from the second processor, and the peerDistance is $2^{i-1}$ away with i increases at each iteration from 1 to nRounds. The plurality of the interconnected processors can collectively process input information at least by exchanging of the data between the first and second processors, so as to generate and output result information. By such manner, it can achieve improving processing speed to the input information and being suitable for using low bandwidth network to process a large amount of data efficiently. In some embodiments, for some real-world applications on a 32-GPU cluster, the result information can serve as a computation result. For example, the system may further include a DNNs training server or cluster configured to process distributed training of DNNs with synchronized stochastic gradient descent algorithms, in which the interconnected processors collectively process the set of sparsified gradients (i.e. the input information), and the result information is used to update model parameter of the DNNs at each iteration or at each training iteration.

For each iteration of the each process on each processor until nRounds rounds of iterations the interconnected processor with the identifier g will transmit the data array, sends, to one other processor in the said plurality of interconnected processors with an identifier peer wherein peer peerMasks[g]×$2^{i-1}$+g with i increases at each iteration from 1 to nRounds wherein peerMasks is not updated before the first iteration and only updated at the end of each iteration in accordance to the peerDistance.

For each iteration of the each process on each processor until nRounds rounds of iterations the interconnected processor with the identifier g will receive the data array from one other processor in the said plurality of interconnected processors with an identifier peer wherein peer peerMasks[g]×$2^{i-1}$+g with i increases at each iteration from 1 to nRounds, and store in the data array recvs.

The data array recvs in each process on each processor until nRounds rounds of iterations is split into a non-zero gradients array, $V^{peer}$, and an indices array, $I^{peer}$.

Each process on each processor until nRounds rounds of iterations, first adding the non-zero gradients array, $V^{peer}$, to the set, G, of sparsified gradients data at said interconnected processor to form a set, G', of expanded sparsified gradients data, followed by selecting the top non-zero absolute values of k gradient data elements in the set, G', and storing these k gradient data elements in a data array $V^{local}$ and storing the corresponding indices of these k gradient data elements in a data array $I^{local}$.

For the set, mask, setting the 1 data at the corresponding indices in the data array which are not in $I^{local}$ to 0 and the mask[I\$I^{local}$]=0.

The data array, sends, in each process on each processor at each iteration from 1 to nRounds is set to the values of the appended arrays of [$V^{local}$, $I_{local}$].

The set, G"; of sparsified gradients data at said interconnected processor is set at the values of $V^{local}$.

After the nRounds iterations the each processor returns the set, G"; of sparsified gradients data and the set, mask, of indices.

Note that gradient sparsification is done on the GPU, which means that the Top-k selection is invoked on the GPU, and then the handler transfers sparsified results to CPU for communication. Such design has two advantages: First, when the number of gradients is large, GPU could be more efficient than CPU; Second, because the density is generally set to a very small value, then transferring the non-values through PCIe could be much faster than transferring the whole gradients.

3. Experimental Study

The experimental evaluations are conducted herein to show the effectiveness of the proposed gTop-k S-SGD by real-world applications on a 32-GPU cluster. The convergence of the proposed gTop-k S-SGD is validated, which should have nearly consistent convergence behavior with the dense version. Then the time cost and efficiency of gTopKAllReduce are evaluated and compared with the dense AllReduce (DenseAllReduce) and the Top-k AllReduce (gTopKAllReduce) in different sizes of messages. After that, there is a comparison on the training efficiency among the three S-SGD algorithms (i.e., S-SGD with dense gradients, Top-k S-SGD, and gTop-k S-SGD). The training process in an iteration is broken down into several time-consuming phases to analyze the extra overheads that are introduced by gTop-k sparsification.

Experimental Setup

Hardware: The distributed environments are configured as a 32-GPU cluster with 32 machines, each of which is equipped with one Nvidia P102-100 GPU. The network between two machines is 1 Gbps Ethernet (1 GbE). Details of the hardware are shown in Table 3. Each machine is under a low-performance configuration just like a personal desktop computer.

TABLE 3

The experimental setup of hardware.

| Hardware | Model |
|---|---|
| CPU | Intel(R) Celeron(R) CPU N3350 @ 1.10 GHz |
| GPU | Nvidia P102-100 (3200 CUDA cores and 5 GB Memory) |
| PCI-e | PCI-e × 1 lane with a maximum bandwidth of 250 MB/s |
| Memory | 4 GB DDR3 with a 16 GB swap file |
| Disk | 256 GB SSD |
| Network | 1 Gbps Ethernet (1 GbE) |

Software: All GPU machines are installed with Ubuntu-16.04, the Nvidia GPU driver at version 390.48 and CUDA-9.1. The communication libraries are OpenMPI-3.1.1 and NCCL-2.1.5. The highly optimized distributed training library Horovod at the version of 1.4.1 is used herein. The deep learning framework is PyTorch at the version of 0.4.0 with cuDNN-7.1.

TABLE 4

Datasets for evaluation.

| Dataset | Training samples | Validation samples | Input size |
|---|---|---|---|
| Cifar-10 | 50000 | 10000 | 32 × 32 |
| ImageNet | 1.2 million | 10000 | 224 × 224 |
| PTB | 923000 | 73000 | 10000 |

TABLE 5

Deep models for training.

| Model | Dataset | # of Epochs | Batch size | Learning rate |
|---|---|---|---|---|
| VGG-16 | Cifar-10 | 140 | 128 | 0.1 |
| ResNet-20 | Cifar-10 | 140 | 128 | 0.1 |
| AlexNet | ImageNet | 45 | 64 | 0.01 |
| ResNet-50 | ImageNet | 15 | 256 | 0.01 |
| LSTM-PTB | PTB | 40 | 100 | 1.0 |

Note:
All models are trained with the single precision floating point (i.e., 32-bit).

DNNs: Various DNNs from several areas of A applications with different datasets are chosen. The datasets include Cifar-10 and ImageNet for image classification and the Penn Treebank corpus (PTB) for language modeling. The data sizes of evaluated datasets are shown in Table 4. For each dataset, one to two benchmarking deep models is/are used. For the Cifar-10 dataset, the VGG-16 model and the ResNet-20 model are used. For the ImageNet dataset, the AlexNet model and the ResNet-50 model are used. A 2-layer LSTM language model (LSTM-PTB) is exploited for the PTB dataset, which is similar as in. The details of the deep models are shown in Table 5. All the model training are using momentum SGD with a momentum of 0.9.

Convergence Comparison

The convergence of Top-k sparsification S-SGD has been verified to be nearly consistent with the dense version in much previous work, so the convergence curves of Top-k S-SGD would not be included. The gTop-k S-SGD is compared with the original S-SGD with dense gradients running on 4 workers. It has been shown that the warmup strategy in the first several epochs helps the model convergent better, so the similar warmup configuration is adopted.

To be specific, the first 4 epochs use the dynamic densities of [0.25, 0.0725, 0.015, 0.004] and smaller learning rates, and the remaining epochs adopt a density of 0.001 or 0.005, which means that the gradients can be compressed by hundreds of smaller size of communication messages from the fifth epoch.

Figure 5A:
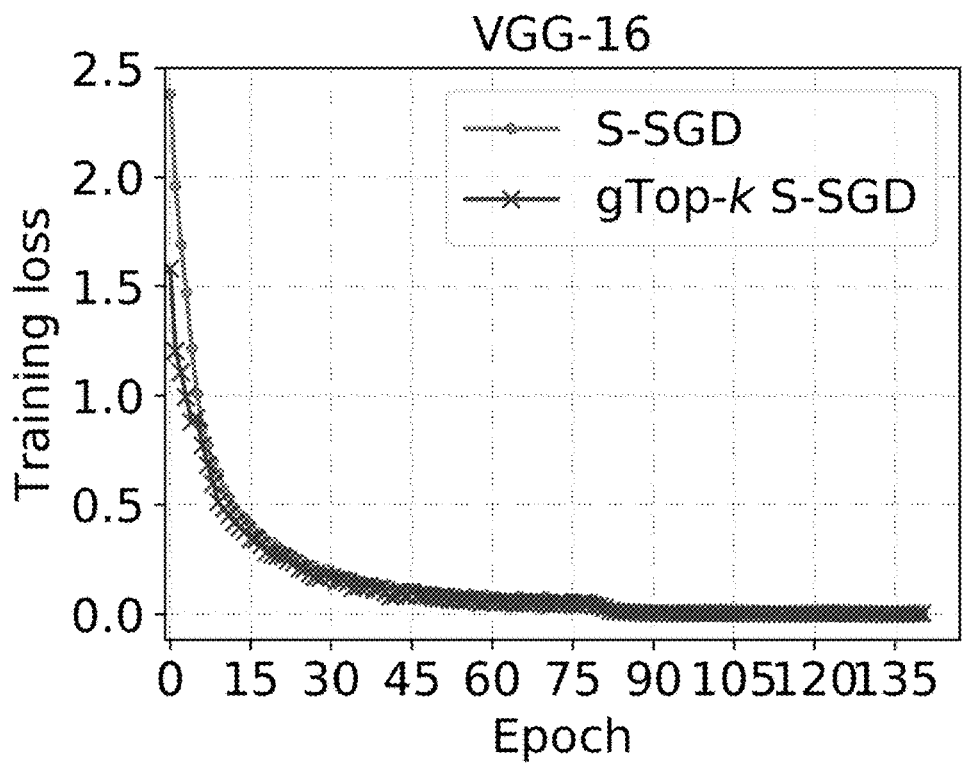
FIG. 5A shows the convergence of the deep models on the Cifar-10 dataset of VGG-16.
Figure 5B:
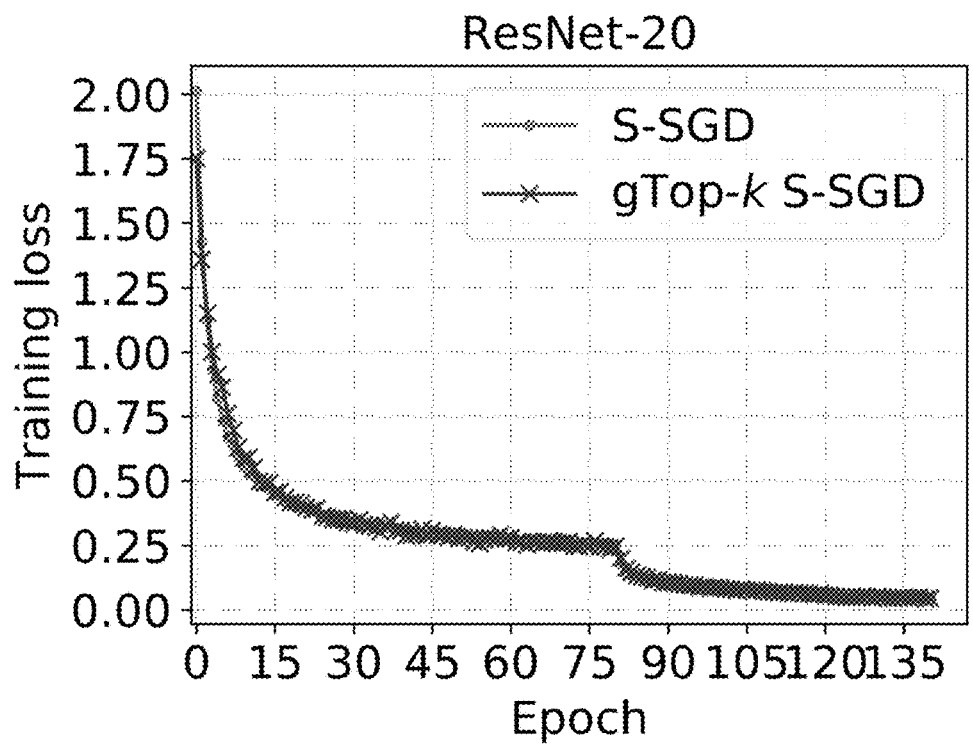
FIG. 5B shows the convergence of the deep models on the Cifar-10 dataset of ResNet-20.

Convergence on the Cifar-10 dataset: The convergence of VGG-16 and ResNet-20 models on the Cifar-10 dataset is shown in FIGS. 5A and 5B. The results show that the convergence rate of ResNet-20 is almost the same with the baseline, while the VGG-16 model even converges slightly better than the baseline.

Figure 6A:
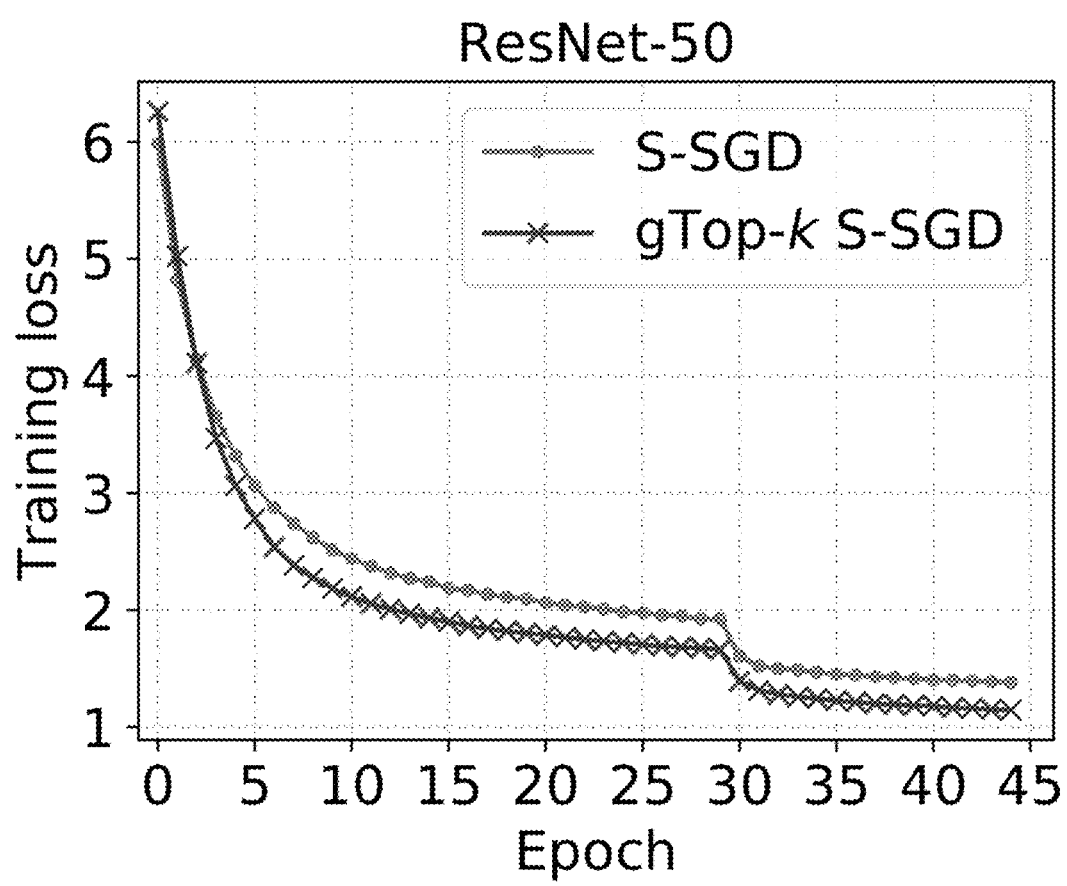
FIG. 6A shows the convergence of the deep models on the ImageNet dataset of ResNet-50.
Figure 6B:
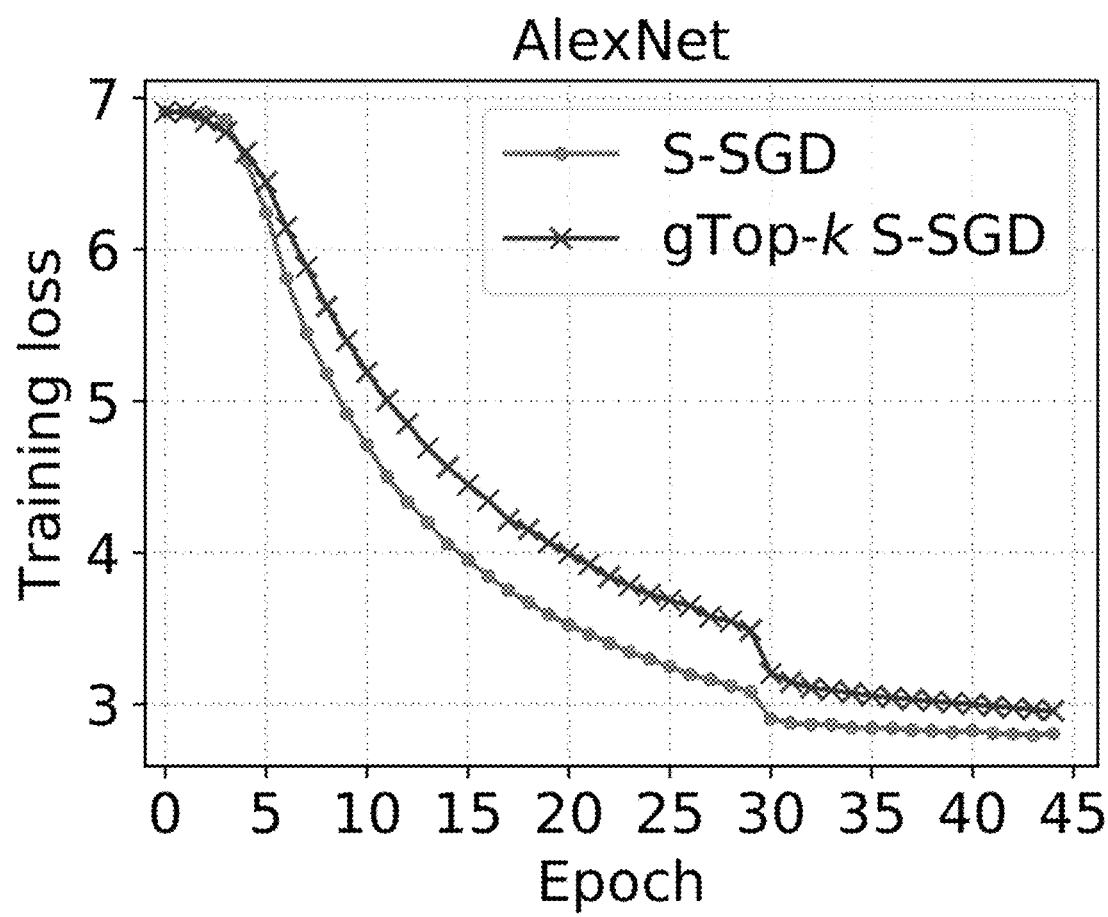
FIG. 6B shows the convergence of the deep models on the ImageNet dataset of AlexNet.

Convergence on the ImageNet dataset: The convergences of AlexNet and ResNet-50 models on the ImageNet dataset are shown in FIGS. 6A and 6B. Again, the results show that the convergence rates of the two networks are close to the baselines. On the AlexNet model, the convergence of gTop-k S-SGD with 0.001 density is slightly worse than the baseline, which could be caused by the very low density effected on the convolutional layers while the fully connected layers have a large proportion of parameters. On the other hand, gTop-k sparsification works well on the ResNet-50 model, which converges slightly faster than the baseline.

Figure 7:
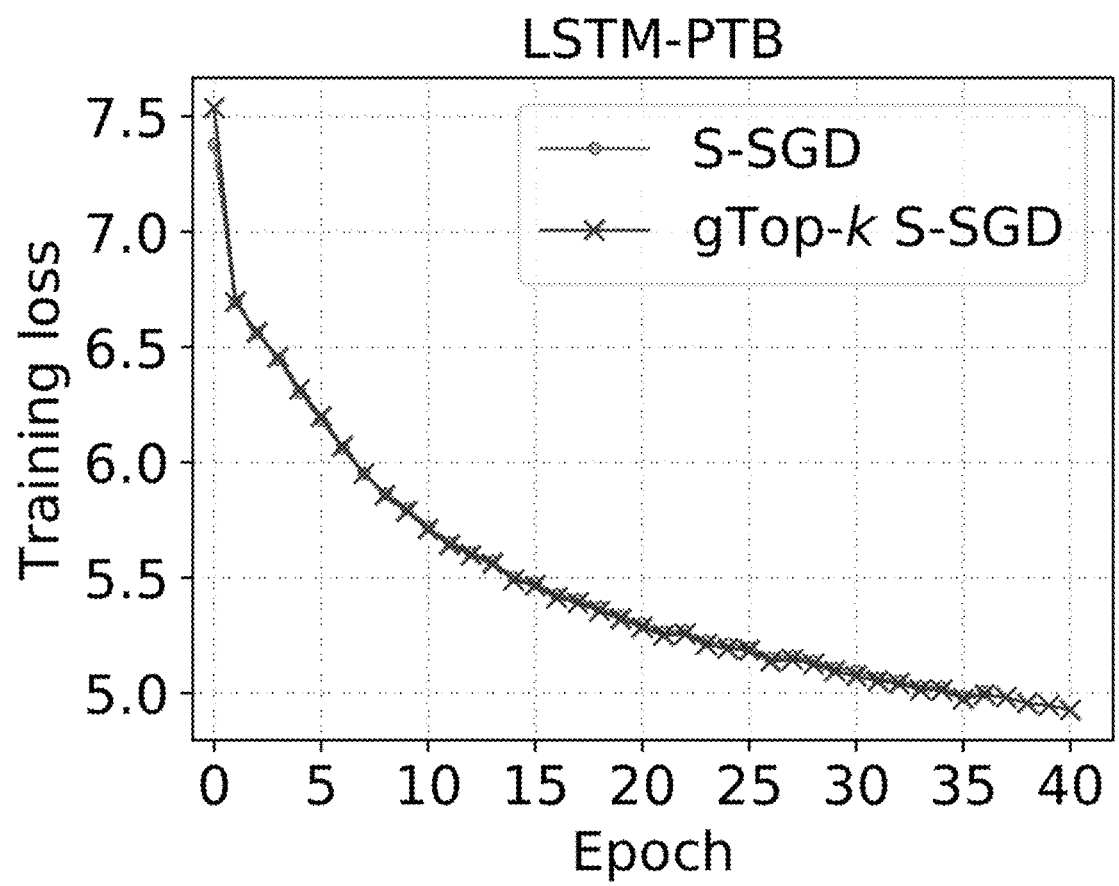
FIG. 7 shows the convergence of the deep models on the PTB dataset with a density of 0.005.

Convergence on the LSTM network: The convergence of LSTM-PTB on the PTB dataset is shown in FIG. 7. It is also noted that gTop-k S-SGD converges close to that of S-SGD under a density of 0.005.

In summary, three different types of DNNs from different benchmarking datasets show that their proposed gTop-k sparsification on S-SGD would not damage the model during training and keeps very close model convergence to the dense version of S-SGD.

Communication Speed

Before demonstrate the efficiency of gTop-k S-SGD, first evaluate the communication speed of the cluster. The point-to-point communication time is tested with some various sizes of messages because the performance of point-to-point communication plays an important role on MPI collectives and their gTopKAllReduce. After that the time speeds of DenseAllReduce, TopKAllReduce and gTopKAllReduce are evaluated in different sizes of sparse vectors and a scaling number of workers on the 1 GbE cluster.

Figure 8:
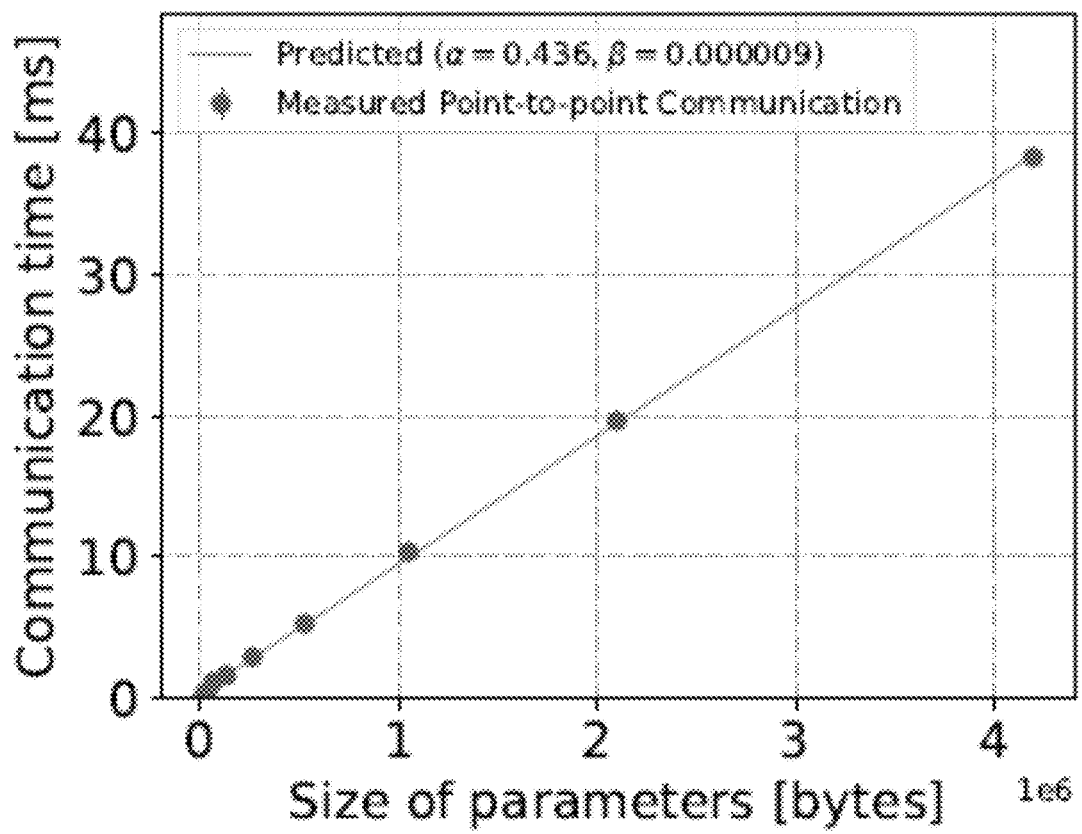
FIG. 8 shows data transfer time in milliseconds with respect to the size of message on the experiment cluster.

Point-to-point communication: The point-to-point communication speed is tested by using OSU Micro-Benchmark at the version of 5.5. The time costs of the point-to-point communication between two machines are shown in FIG. 8, in which the test is run 5 times to calculate the mean and standard variance from the reported values. It can be seen that the time used for transferring a message is a linear function with the size of the message, which verifies the $\alpha$-$\beta$ model. Based on the measured data, $\alpha=0.436$ ms and $\beta=9\times10^{-6}$ ms is obtained.

Figure 9A:
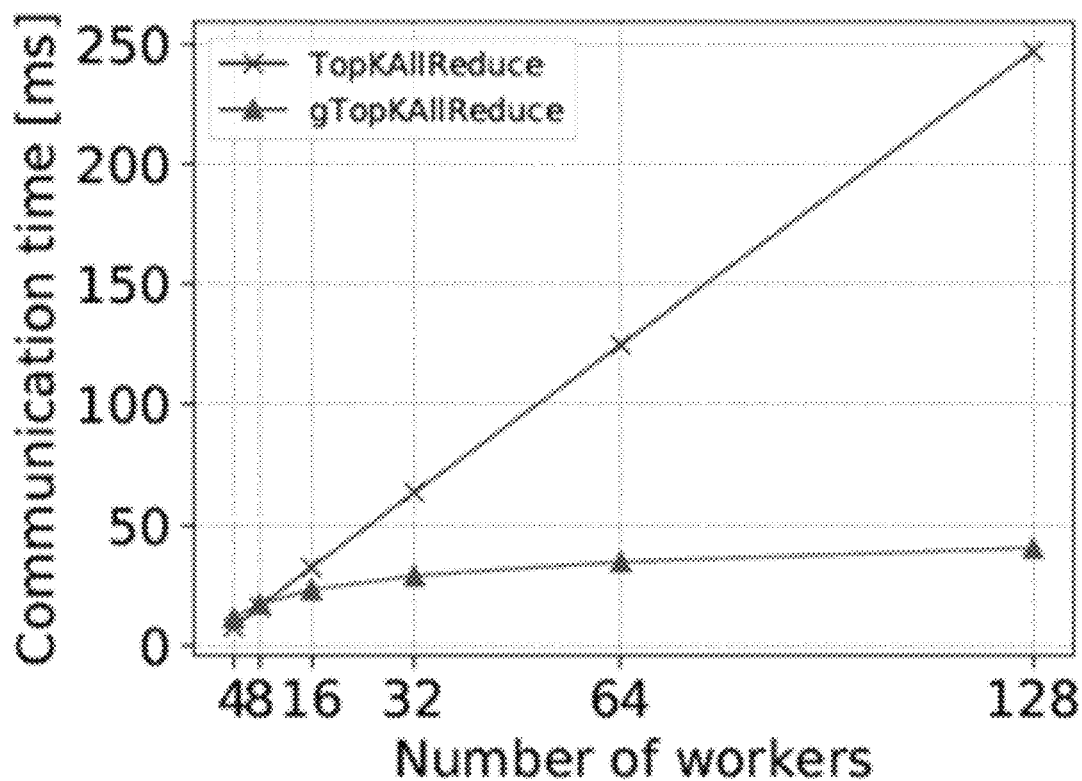
FIG. 9A shows time used for AllReduce algorithms on different number of workers at the message size of 100 MB and the density of $\rho=0.001$.
Figure 9B:
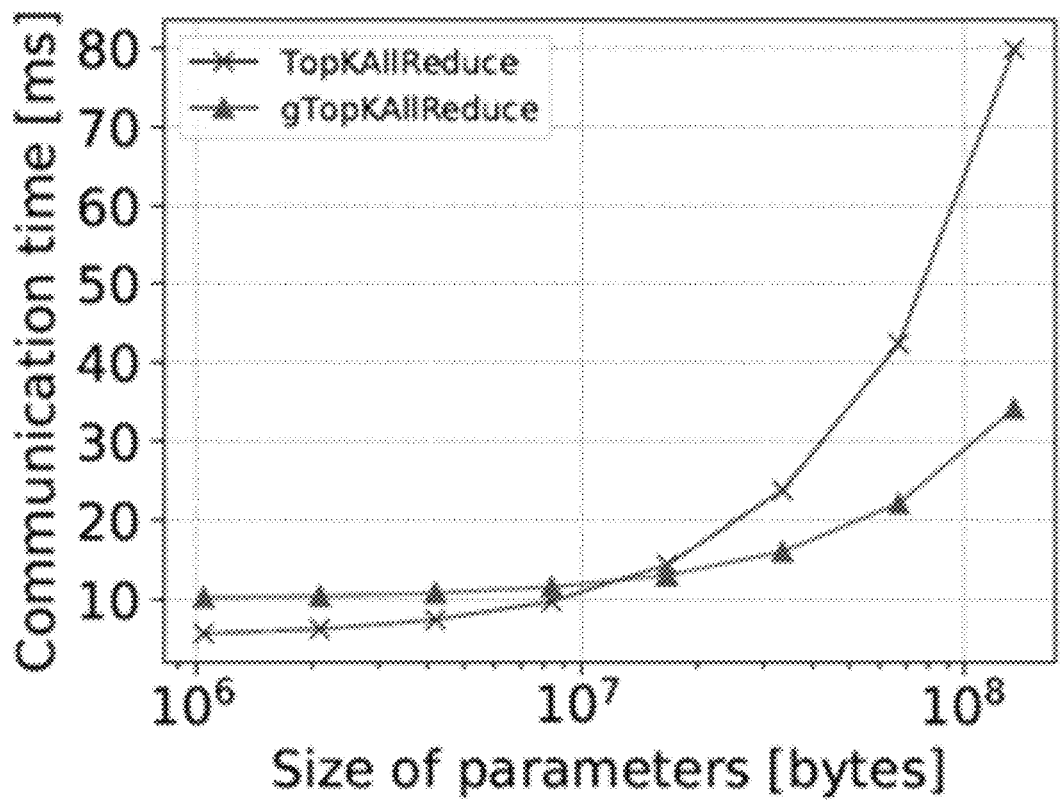
FIG. 9B shows the time cost with respect to the message size on a cluster with 32 workers. The lower the better.
Figure 10A:
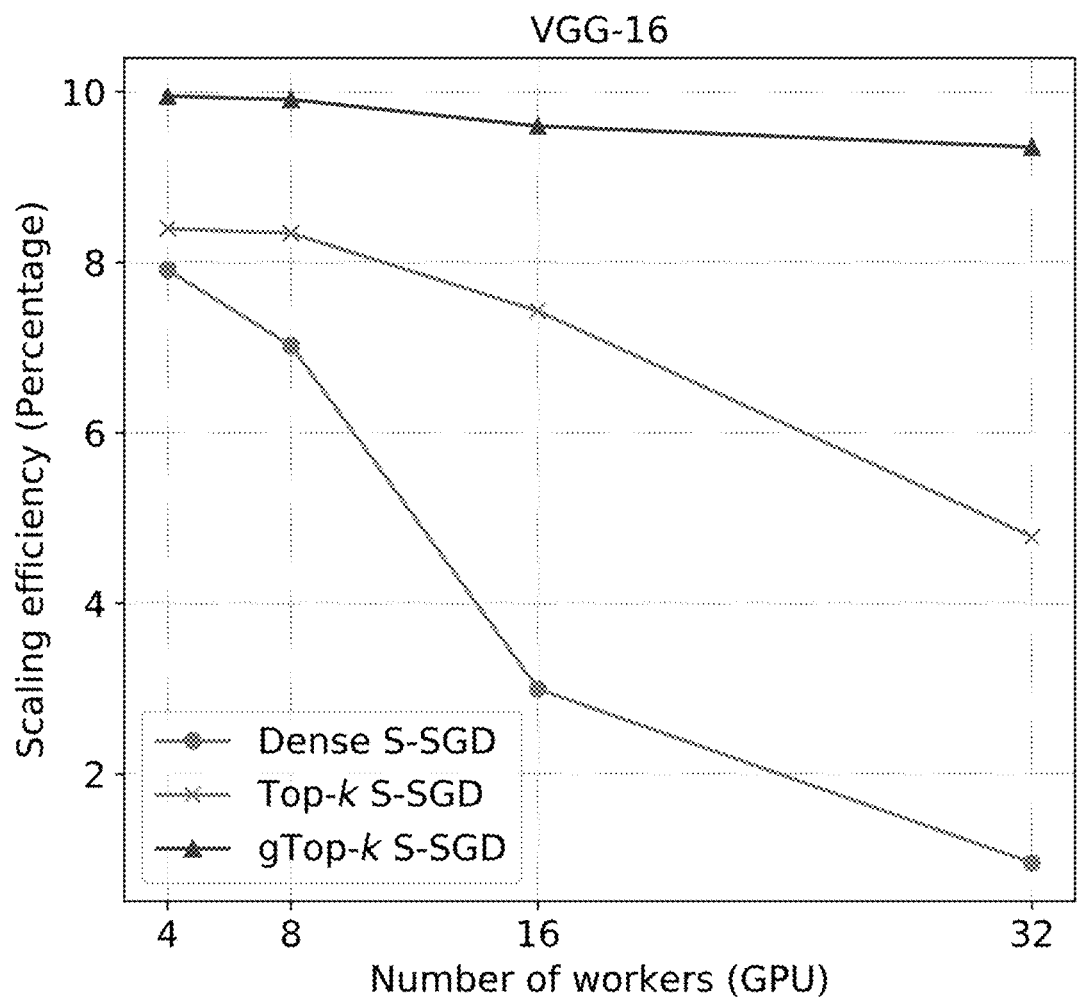
FIG. 10A shows comparison of scaling efficiency of S-SGD with dense AllReduce (Dense S-SGD), Top-k sparsification (Top-k S-SGD) and gTop-k sparsification (gTop-k S-SGD) with VGG-16 on the data set of Cifar-10, where $k=0.001\times m$, which the higher the better.
Figure 10B:
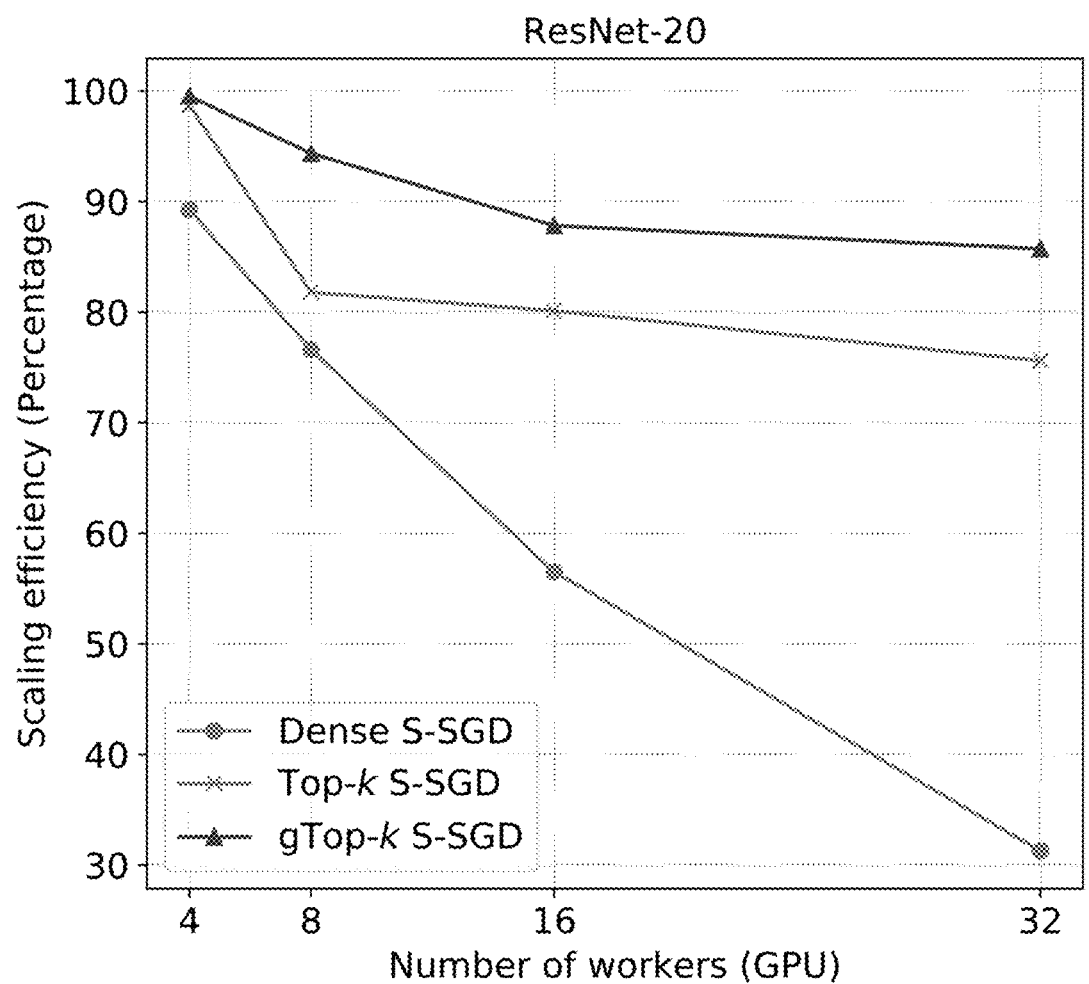
FIG. 10B shows the comparison of scaling efficiency of Dense S-SGD, Top-k S-SGD and gTop-k S-SGD with ResNet-20 on the data set of Cifar-10, where $k=0.001\times m$, which the higher the better.
Figure 10C:
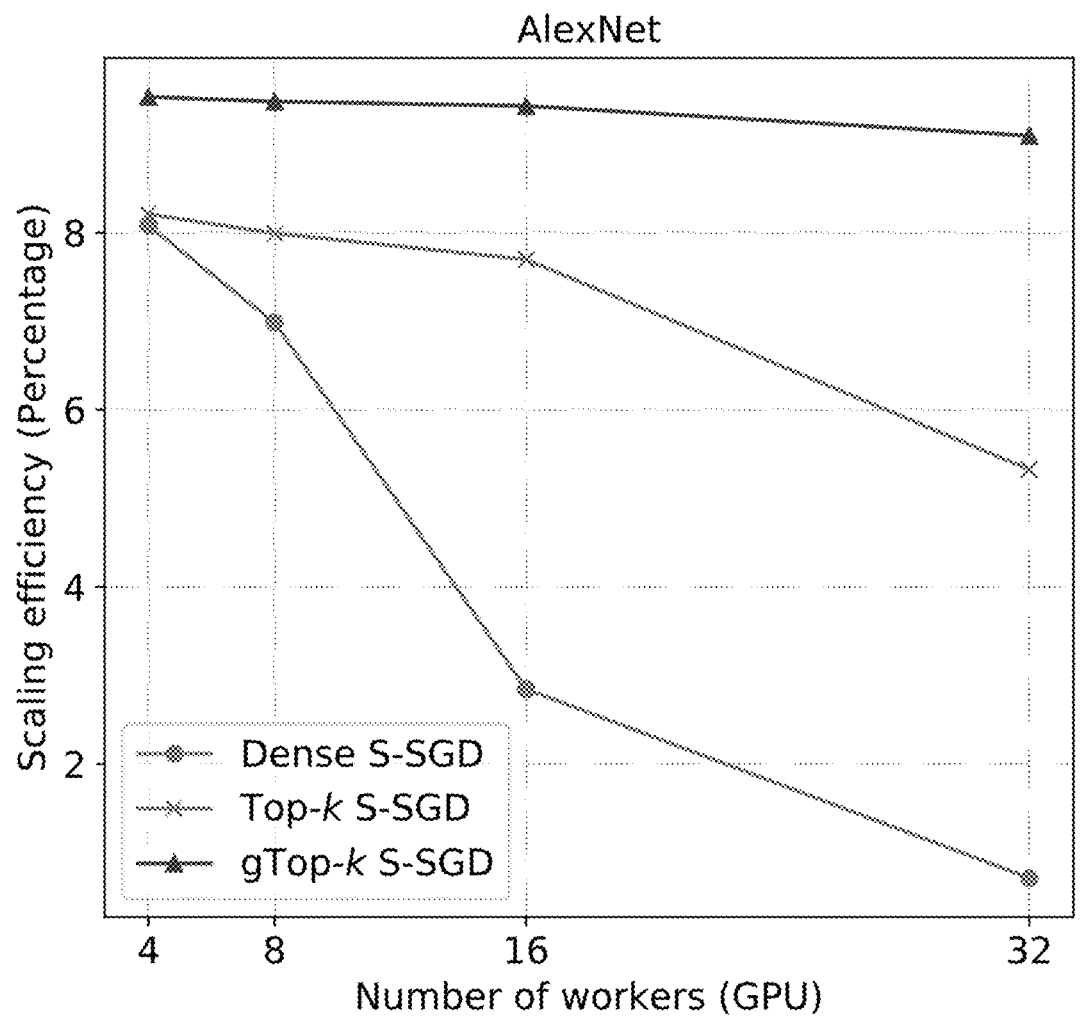
FIG. 10C shows the comparison of scaling efficiency of Dense S-SGD, Top-k S-SGD and gTop-k S-SGD with AlexNet on the data set of ImageNet, where $k=0.001\times m$, which the higher the better.
Figure 10D:
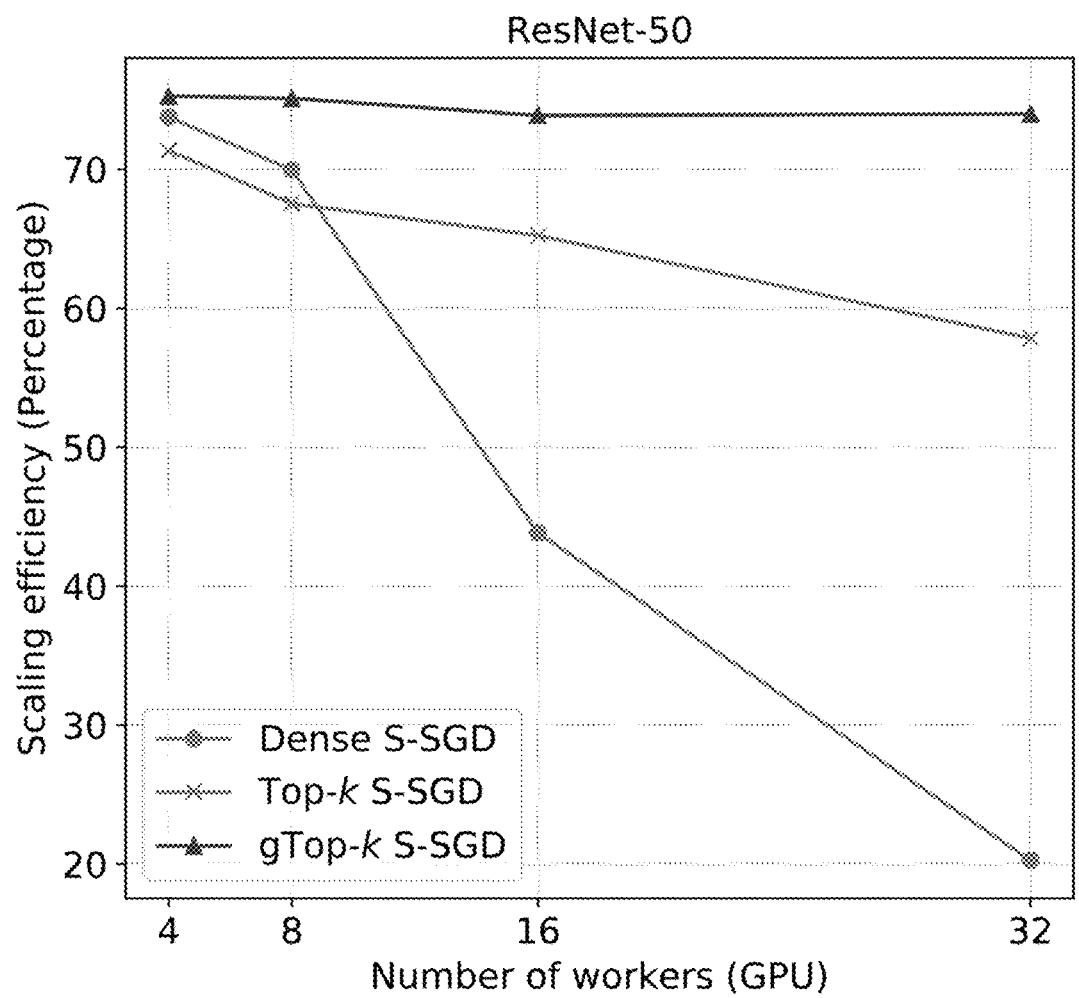
FIG. 10D shows the comparison of scaling efficiency of Dense S-SGD, Top-k S-SGD and gTop-k S-SGD with ResNet-50 on the data set of ImageNet, where $k=0.001\times m$, which the higher the better.

Time performance of AllReduce operations: Since P and m are two main factors affecting the performance of TopKAllReduce and gTopkAllReduce, the time performances in two dimensions (i.e., P and m) are compared based on the measured $\alpha$, $\beta$ and the time cost models in Table. 1. First, the time cost is compared with the number of workers increases based on m=100 MB (the approximate model size of ResNet-50) and $\rho=0.001$. Second, in the configuration of a cluster with 64 workers, there is a comparison on how the time cost changes with the size of the message increases. The first comparison is shown in FIG. 9A and the second one is shown in FIG. 9B. From FIG. 9A, when the number of workers is small, TopKAllReduce is slightly faster than gTopKAllReduce. However, when the number of workers scales to 32, TopKAllReduce becomes much worse than gTopKAllReduce. Furthermore, it is provided that gTopKAllReduce is much more efficient than TopKAllReduce when scaling to large sizes of messages as shown in FIG. 9B. To summarize, a larger number of workers or a larger message size would make gTopKAllReduce higher efficiency than TopKAllReduce.

TABLE 6

Training speed on a single P102-100 GPU.

| Model | Batch size | Iteration time | Throughput |
|---|---|---|---|
| VGG-16 | 128 | 0.097 s | 1317 Images/s |
| ResNet-20 | 128 | 0.146 s | 876 Images/s |
| AlexNet | 64 | 0.369 s | 173 Images/s |
| ResNet-50 | 256 | 4.842 s | 52 Images/s |

Training Efficiency

Single-GPU training speed: The average training speed of one iteration on a single GPU is first demonstrated, which is shown in Table 6. It can be seen that the computation time of each iteration is from tens of milliseconds to several seconds so that scaling such models on 1 GbE clusters is challenging especially for the models with a large number of parameters (e.g., AlexNet) because of high communication-to-computation ratios.

Scaling efficiency: After integrating gTopAllReduce to gTop-k S-SGD, it is worthwhile to consider how many speedups can be achieved on the low bandwidth networks with different models on a different number of workers. The scaling efficiency of S-SGD with three different AllReduce algorithms (Dense S-SGD, Top-k S-SGD and gTop-k S-SGD) on four models (VGG-16, ResNet-20, AlexNet and ResNet-50) are shown in FIG. 10A-10D. It can be seen that the dense S-SGD has worst scaling efficiency because the full size of gradients makes the communication very slow on 1 GbE clusters. The Top-k S-SGD achieves some improvement on a smaller number of workers than S-SGD, but it has an obvious performance decrease when scaling to 32 GPUs. However, the algorithm gTop-k S-SGD achieves much more stable scaling efficiency even on clusters with a larger number of GPUs. For example, when scaling to 32 GPUs, the proposed gTop-k S-SGD achieves 6.7× faster than dense S-SGD on average, and it achieves 1.4× improvement on average compared to Top-k. Particularly, gTop-k S-SGD is up to 12× and 1.7× than S-SGD and Top-k S-SGD respectively on the AlexNet model. Summary of the training throughput on different models is shown in Table. 7.

TABLE 7

The system training throughput on a 32-GPU cluster.

| Model | Dense S-SGD | Top-k | gTop-k | g/d | g/t |
|---|---|---|---|---|---|
| VGG-16 | 403 | 2016 | 3020 | 7.5× | 1.5× |
| ResNet-20 | 9212 | 22272 | 25280 | 2.7× | 1.1× |
| AlexNet | 39 | 296 | 505 | 12.8× | 1.7× |
| ResNet-50 | 343 | 978 | 1251 | 3.65× | 1.3× |

Note:
The throughput is measured with processed images per second (i.e., the unit is Images/s). g/d indicates the speedup of gTop-k compared to the dense one, and g/t indicates the speedup of gTop-k compared to Top-k.

Time Performance Analysis

The cases of 32 workers are used to analyze the time performance of gTop-k S-SGD. To better understand the overheads of gTop-k sparsification, the time of an iteration is broken down into three parts: GPU computation time ($t_{compu.}$), local sparsification time ($t_{compr.}$), and communication time ($t_{commu.}$). Note that in the present invention, the parallelization between computation and communication during backward propagation is not taken into account. The main reason is that for some deep models like ResNet-50 that consume large size of memory and the mini-batch size could not be set too large, to the computation time is short. But it is also needed to reduce the communication-to-computation ratio to alleviate the impact of communication, so an effective method is to accumulating gradients for different small sizes of un-updated mini-batches. In the evaluated experiments of ResNet-50, local mini-batch size is set as 16, and it accumulates the gradients 16 times for a single update, so the effective mini-batch size is 256. Therefore, it has little contributions from the pipeline of backward propagation and communication on low-bandwidth networks. But gTop-k sparsification is also applicable to the wait-free backward propagation algorithm and the optimal gradient merge algorithm.

Figure 11:
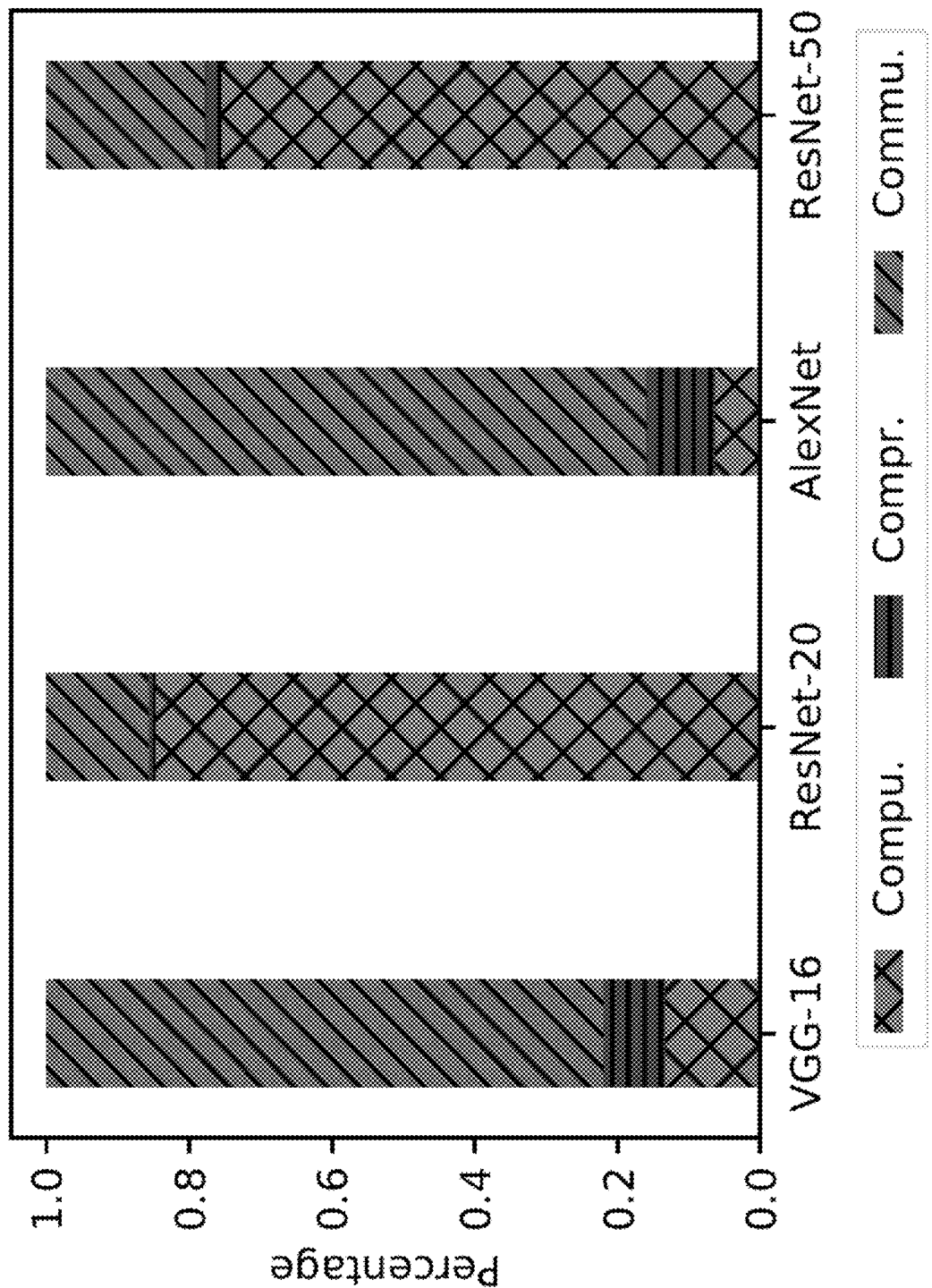
FIG. 11 shows time breakdown of computation, compression and communication. "Compu." indicates forward and backward computation, "Compr." indicates the compression (sparsification) operation, and "Commu." indicates gTop-k gradients communication.

The time breakdown for the evaluated 4 models is shown in FIG. 11. From FIG. 11, on one hand, in time breakdown of VGG-16 and AlexNet models, the communication overheads are much larger than computation because VGG-16 and AlexNet have three fully connected layers which are equipped with a large number of parameters, while the computation is fast. These also reflect that the scaling efficiency is low in FIG. 11 of S-SGD even with gTop-k sparsification. On the other hand, the communication and sparsification overheads are much smaller than the computation with ResNet-20 (FIG. 10B) and ResNet-50 (FIG. 10D), which indicates low communication-to-computation ratios, so that the scaling efficiency can be up to 80% even on the low-bandwidth network.

Furthermore, it is noted that the time used by gradient sparsification is comparable to the computation time on VGG-16 and AlexNet models. The main reason is that Top-k selection on GPU is inefficient, which generally requires a sort operation on the whole gradients, and it could be non-trivial to be highly parallelized on SIMD architectures.

Convergence Sensibility to Densities

Figure 12A:
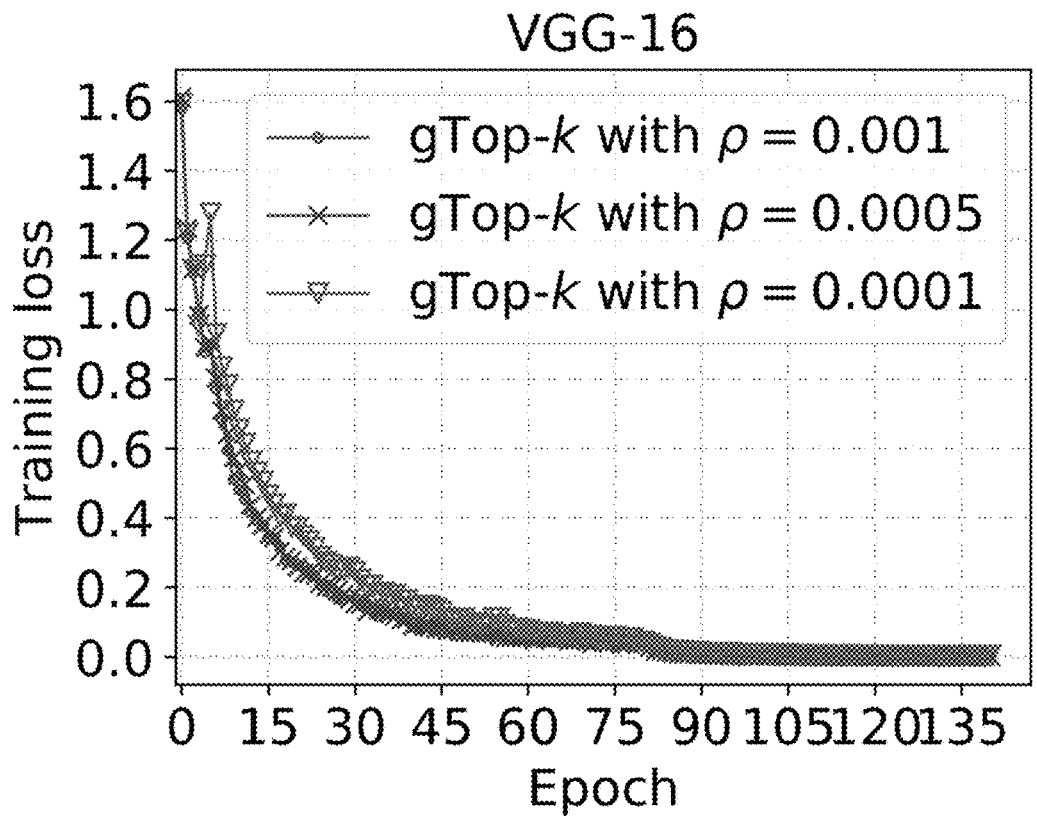
FIG. 12A shows training losses on VGG-16 with different $\rho$.
Figure 12B:
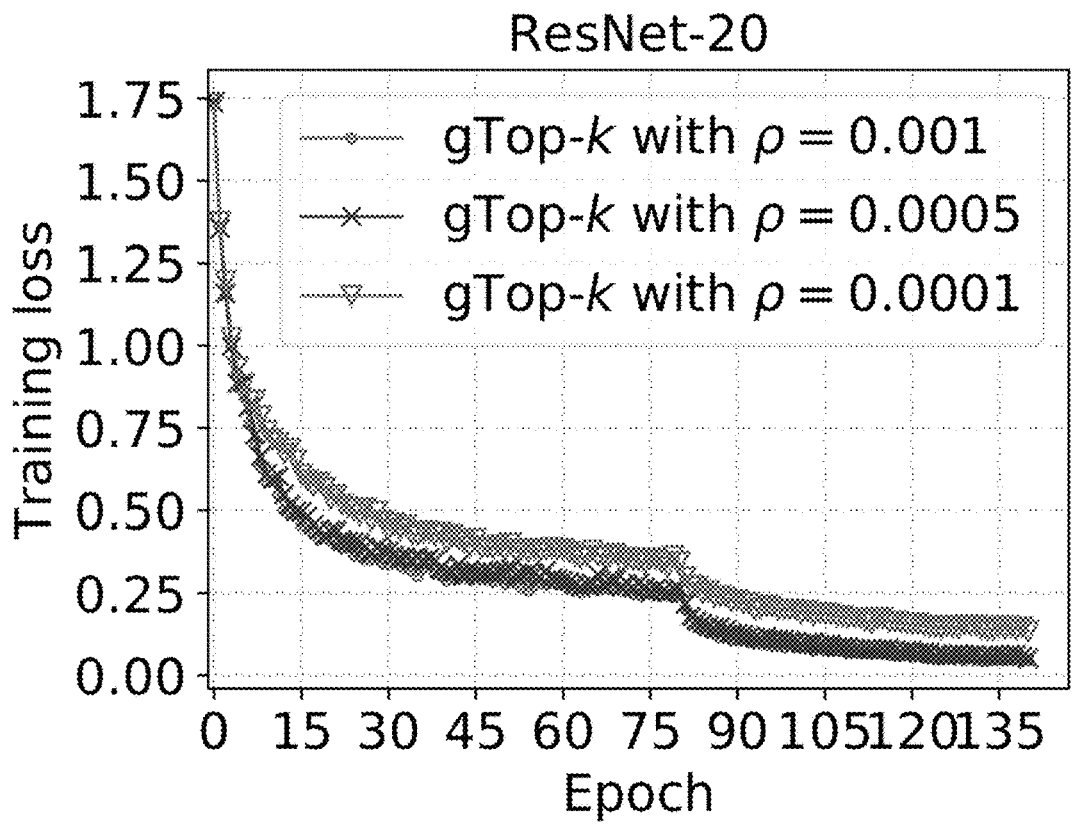
FIG. 12B shows training losses on ResNet-20 with different $\rho$.

To understand the sensitivity of model convergence to densities, the experiments with different values of the density ρ are conducted using VGG-16 and ResNet-20 on the Cifar-10 dataset. The convergence curves are shown in FIGS. 12A and 12B. It can be seen that even a very low density of 0.0005 does not have a big impact to the model convergence to both models. However, a trade-off should be made to balance the high sparsification ratio and the convergence speed. One one hand, the higher sparsification would bring higher scaling efficiency to a larger number of workers. One the other hand, one should also be careful to the upper bound of the sparsity that would have a negative impact on the model convergence.

CONCLUSION

In this invention, it is first shown that the accumulating results from Top-k gradients can be further sparsified by choosing some largest absolute gradients before updating the model, which has no much impact on the model convergence. Then it is identified that the Top-k sparsification is inefficient in averaging the gradients from all workers because the indices of the Top-k gradients are not the same such that one should use the AllGather collective to collect all the Top-k gradients and indices. The AllGather method for Top-k aggregation (TopKAllReduce) is linear expensive to the number of workers (i.e., the communication complexity is O(kP), where P is the number of workers), so it would have very low scalability when scaling to large-scale clusters. To this end, a global Top-k (gTop-k) sparsification approach is provided for S-SGD, which is communication-efficient. The gradient aggregation algorithm based on gTop-k, named gTopKAllReduce, only requires a communication complexity of $O(k\log_2 P)$, which is much lower than TopKAllReduce. Experimental studies on various of deep neural networks including convolutional neural networks and recurrent neural networks (LSTM) are conducted to verify gTop-k S-SGD has little impact on the model convergence (experimental results demonstrate that the convergence curves are similar to S-SGD with dense gradients). The experiments conducted on the 32-GPU cluster interconnected with 1 Gbps Ethernet show that the proposed gTop-k S-SGD has much higher scaling efficiency than S-SGD and Top-k S-SGD. It relates to gTop-k sparsification for low bandwidth networks. It is verified that gTop-k S-SGD has nearly consistent convergence performance with S-SGD and evaluate the training efficiency of gTop-k S-SGD on a cluster with 32 GPU machines which are inter-connected with 1 Gbps Ethernet. The experimental results show that the present method achieves up to 2.7-12× higher scaling efficiency than S-SGD with dense gradients, and 1.1-1.7× improvement than the existing Top-k S-SGD.

INDUSTRIAL APPLICABILITY

The present invention relates to a system for efficient large-scale data distribution and parallel processing environment. In particular, the present invention relates to global Top-k sparsification for low bandwidth networks.

The invention claimed is:

1. A system for efficient large-scale data distribution in a distributed and parallel processing environment for training an artificial neural network having a plurality of the processing nodes, the system comprising:
a set of interconnected processors executing a plurality of processes,
wherein at each of the processes on each of the interconnected processors receives input data defining:
a total number (P) of the interconnected processors;
an identifier (g) identifying the interconnected processor where the process is executed thereon;
a set (G) of sparsified gradients data at the interconnected processor; and
a total number (k) of non-zero elements in the set (G) of sparsified gradients data; and
wherein each of the processes further comprises:
initializing a set (mask) of zero data of the same dimension as the set (G) of sparsified gradients data;
extracting the non-zero elements in the set of sparsified gradients data into a first data array and the indices of the non-zero elements in the set of sparsified gradients into a second data array (I);
appending the second data array to the end of the first data array to form a data array (sends);
setting the zero data in the set (mask) of zero data at the indices of non-zero elements in the set of sparsified gradients to 1;
initializing a data array (recvs) of the same dimension as the data array (sends) to receive data from one other processor in the plurality of interconnected processors;
initializing a data array (peerMasks) of size P; and
initializing the each of the processes on each of the interconnected processors to perform nRounds times, wherein nRounds equals to $\log_2 P$, for each iteration of each of the processes on each of the interconnected processors until nRounds rounds of iterations;
wherein a first processor and a second processor of the interconnected processors are chosen to exchange data with each other, the first processor is peerDistance away from the second processor, and the peerDistance is $2^{i-1}$ away with i increases at each iteration from 1 to nRounds;
wherein the plurality of the interconnected processors collectively processes input information at least by the data exchanged between the first and second processors to generate and output result.

2. The system according to claim 1, wherein for each iteration of each of the processes on each of the processors until nRounds rounds of iterations one of the interconnected processors with the identifier (g) transmits the data array (sends) to another processor of the interconnected processors with an identifier (peer), wherein peer is equal to peerMasks[g]×$2^i$+g with i increases at each iteration from 1 to nRounds, and wherein peerMasks is not updated before the first iteration and only updated at the end of each iteration in accordance to the peerDistance.

3. The system according to claim 1, wherein for each iteration of each of the processes on each of the interconnected processors until nRounds rounds of iterations one of the interconnected processors with the identifier (g) receives the data array from another processor of the interconnected processors with an identifier (peer), wherein peer is equal to peerMasks[g]×$2^i$+g with i increases at each iteration from 1 to nRounds, and is stored in the data array (recvs).

4. The system according to claim 3, wherein the data array (recvs) in each of the processes on each of the interconnected processors until nRounds rounds of iterations is split into a non-zero gradients array ($V^{peer}$) and an indices array ($I^{peer}$).

5. The system according to claim 4, wherein in each of the processes on each of the interconnected processors until nRounds rounds of iterations, the system first adds the non-zero gradients array ($V^{peer}$) to the set (G) of sparsified gradients data at said interconnected processor to form a set (G') of expanded sparsified gradients data, followed by selecting the top non-zero absolute values of k gradient data elements in the set (G') and storing the k gradient data elements in a data array ($V^{local}$) and storing the corresponding indices of the k gradient data elements in a data array ($I^{local}$).

6. The system according to claim 5, wherein the data in the set (mask) having been set to 1 at the corresponding indices in the data array which are not in $I^{local}$ is set to 0 and the mask[I/$I^{local}$] is equal to 0.

7. The system according to claim 5, wherein the data array (sends) in each of the processes on each of the processors at each iteration from 1 to nRounds is set to the values of the appended arrays of [$V^{local}$, $I^{local}$].

8. The system according to claim 5, wherein a set (G') of sparsified gradients data at said interconnected processor is set at the values of $V^{local}$.

9. The system according to claim 6, wherein after the nRounds iterations each of the processors returns the set (G") of sparsified gradients data and the set (mask) of indices.

10. The system according to claim 1, further comprising a deep neural networks (DNNs) server or cluster configured to process distributed training of DNNs with synchronized stochastic gradient descent algorithms, wherein the interconnected processors collectively process the set of sparsified gradients, and the result information is used to update model parameter of the DNNs at each iteration.

11. A method for efficient large-scale data distribution in a distributed and parallel processing environment for training an artificial neural network having a plurality of the processing nodes, the method comprising:
executing a plurality of processes by a set of interconnected processors,
wherein at each of the processes on each of the interconnected processors receives input data defining:
a total number (P) of the interconnected processors;
an identifier (g) identifying the interconnected processor where the process is executed thereon;
a set (G) of sparsified gradients data at the interconnected processor; and
a total number (k) of non-zero elements in the set (G) of sparsified gradients data;
wherein each of the processes further comprises:
initializing a set (mask) of zero data of the same dimension as the set (G) of sparsified gradients data;
extracting the non-zero elements in the set of sparsified gradients data into a first data array and the indices of the non-zero elements in the set of sparsified gradients into a second data array (I);
appending the second data array to the end of the first data array to form a data array (sends);
setting the zero data in the set (mask) of zero data at the indices of non-zero elements in the set of sparsified gradients to 1;
initializing a data array (recvs) of the same dimension as the data array (sends) to receive data from one other processor in the plurality of interconnected processors;
initializing a data array (peerMasks) of size P; and
initializing each of the processes on each of the interconnected processors to perform nRounds times, wherein nRounds equals to $\log_2 P$, for each iteration of each of the processes on each of the interconnected processors until nRounds rounds of iterations;
wherein the method further comprises:
choosing a first processor and a second processor of the interconnected processors to exchange data with each other, wherein the first processor is peerDistance away from the second processor, and the peerDistance is $2^{i-1}$ away with i increases at each iteration from 1 to nRounds; and
processing input information comprising at least exchanging data between the first and second processors by the plurality of the interconnected processors collectively to generate and output result.

12. The method according to claim 11, wherein for each iteration of each of the processes on each of the processors until nRounds rounds of iterations one of the interconnected processors with the identifier (g) transmits the data array (sends) to another processor of the interconnected processors with an identifier (peer), wherein peer is equal to peerMasks[g]×$2^i$+g with i increases at each iteration from 1 to nRounds, and wherein peerMasks is not updated before the first iteration and only updated at the end of each iteration in accordance to the peerDistance.

13. The method according to claim 11, wherein for each iteration of each of the processes on each of the interconnected processors until nRounds rounds of iterations one of the interconnected processors with the identifier (g) receives the data array from another processor of the interconnected processors with an identifier (peer), wherein peer is equal to peerMasks[g]×$2^i$+g with i increases at each iteration from 1 to nRounds, and is stored in the data array (recvs).

14. The method according to claim 13, wherein the data array (recvs) in each of the processes on each of the interconnected processors until nRounds rounds of iterations is split into a non-zero gradients array ($V^{peer}$) and an indices array ($I^{peer}$).

15. The method according to claim 14, wherein in each of the processes on each of the interconnected processors until nRounds rounds of iterations, the system first adds the non-zero gradients array ($V^{peer}$) to the set (G) of sparsified gradients data at said interconnected processor to form a set (G') of expanded sparsified gradients data, followed by selecting the top non-zero absolute values of k gradient data elements in the set (G') and storing the k gradient data elements in a data array ($V^{local}$) and storing the corresponding indices of the k gradient data elements in a data array ($I^{local}$).

16. The method according to claim 15, wherein the data in the set (mask) having been set to 1 at the corresponding indices in the data array which are not in $I^{local}$ is set to 0 and the mask[I\$I^{local}$] is equal to 0.

17. The method according to claim 15, wherein the data array (sends) in each of the processes on each of the processors at each iteration from 1 to nRounds is set to the values of the appended arrays of [$V^{local}$, $I^{local}$].

18. The method according to claim 5, wherein a set (G") of sparsified gradients data at said interconnected processor is set at the values of $V^{local}$.

19. The method according to claim 6, wherein after the nRounds iterations each of the processors returns the set (G") of sparsified gradients data and the set (mask) of indices.

20. The method according to claim 11, further comprising:
processing distributed training of deep neural networks (DNNs) with synchronized stochastic gradient descent algorithms by a DNNs server or cluster, wherein the interconnected processors collectively process the set of sparsified gradients, and the result information is used to update model parameter of the DNNs at each iteration.

* * * * *